US012149091B2

(12) United States Patent
Snyder et al.

(10) Patent No.: US 12,149,091 B2
(45) Date of Patent: Nov. 19, 2024

(54) ENERGY MANAGEMENT SYSTEM

(71) Applicant: Enertopia Corp., Kelowna (CA)

(72) Inventors: Mark E. Snyder, Poway, CA (US); Paul Michael Sandler, Cypress, CA (US)

(73) Assignee: Enertopia Corp., Kelowna (CA)

( * ) Notice: Subject to any disclaimer, the term of this patent is extended or adjusted under 35 U.S.C. 154(b) by 64 days.

(21) Appl. No.: 17/979,696

(22) Filed: Nov. 2, 2022

(65) Prior Publication Data

US 2023/0137447 A1 May 4, 2023

Related U.S. Application Data

(60) Provisional application No. 63/275,879, filed on Nov. 4, 2021.

(51) Int. Cl.
*H02J 3/38* (2006.01)
*H02J 3/00* (2006.01)
*H02J 3/32* (2006.01)

(52) U.S. Cl.
CPC ............ *H02J 3/381* (2013.01); *H02J 3/0012* (2020.01); *H02J 3/32* (2013.01); *H02J 2300/24* (2020.01)

(58) Field of Classification Search
CPC .. H02J 3/381; H02J 3/0012; H02J 3/32; H02J 2300/24
USPC ............................................ 307/43; 700/286
See application file for complete search history.

(56) References Cited

U.S. PATENT DOCUMENTS

| 7,274,975 | B2 * | 9/2007 | Miller | H02J 3/14 700/295 |
| 8,872,379 | B2 * | 10/2014 | Ruiz | B60L 1/003 307/66 |
| 9,026,347 | B2 * | 5/2015 | Gadh | B60L 53/67 320/132 |
| 9,893,526 | B2 * | 2/2018 | Prosser | H02J 3/32 |
| 11,453,308 | B2 * | 9/2022 | Gupta | B60L 53/52 |
| 2011/0204720 | A1 | 8/2011 | Ruiz et al. | |
| 2012/0245744 | A1 | 9/2012 | Prosser et al. | |
| 2013/0179061 | A1 | 7/2013 | Gadh et al. | |
| 2013/0241485 | A1 | 9/2013 | Snyder | |
| 2021/0268931 | A1 | 9/2021 | Gupta | |

* cited by examiner

*Primary Examiner* — Hal Kaplan
(74) *Attorney, Agent, or Firm* — Mintz Levin Cohn Ferris Glovsky and Popeo, P.C.

(57) ABSTRACT

An energy management system for an energy environment, including a photovoltaic panel and a power supply configured to store energy generated by the photovoltaic panel, may include a plurality of subsystems and an energy management platform for monitoring and controlling each of the plurality of subsystems. The plurality of subsystems may include a first subsystem, and a second subsystem. The platform may include a user interface, and a controller communicatively coupled to each the plurality of subsystems. The controller may receive the data from the first subsystem and adjust, based on the received data, operation of the second subsystem.

65 Claims, 15 Drawing Sheets

1300

```
┌─────────────────────────────────────────────┐
│  RECEIVING DATA FROM A FIRST SUBSYSTEM OF A │
│   PLURALITY OF SUBSYSTEMS OF AN ENERGY      │
│              ENVIRONMENT                    │
│                  1302                       │
└─────────────────────────────────────────────┘
                      │
┌─────────────────────────────────────────────┐
│      ADJUST, BASED ON THE RECEIVED DATA,    │
│   OPERATION OF A SECOND SUBSYSTEM OF THE    │
│         PLURALITY OF SUBSYSTEMS             │
│                  1304                       │
└─────────────────────────────────────────────┘
```

FIG. 13

ENERGY MANAGEMENT SYSTEM

CROSS-REFERENCE TO RELATED APPLICATIONS

This patent application claims priority to U.S. Provisional Application No. 63/275,879, filed Nov. 4, 2021, and titled "Energy Management System," the entirety of which is incorporated by reference herein.

FIELD

The subject matter described herein relates generally to an energy management system, and more particularly to a solar energy management system.

BACKGROUND

A building or other facility may have a number of subsystems that use and/or monitor energy, such as solar energy. For example, a building may have solar panels, batteries, generators, air conditioning systems, and/or the like. Each subsystem can be provided by a different vendor and may have controls that are unique to each vendor. Each subsystem may also be unable to communicate with another subsystem. As a result, the data collected from one subsystem may not be used by another subsystem. Also, an error or failure in one subsystem may cause damage to another subsystem of the facility. Thus, disjointed subsystems may lead to damaged equipment, equipment failure, poor energy efficiency, and/or the like.

SUMMARY

Systems, methods, and articles of manufacture, including computer program products, are provided for generating a blended data visualization that provides a visual representation of data stored in a database. In one aspect, there is provided a system. The system may include at least one data processor and at least one memory. The at least one memory may store instructions and/or data from many subsystems that result in operations when executed by the at least one data processor.

An energy management system for an energy environment, including a photovoltaic panel and a power supply configured to store energy generated by the photovoltaic panel, may include a plurality of subsystems and an energy management platform for monitoring and controlling each of the plurality of subsystems. The plurality of subsystems may include a first subsystem, and a second subsystem. The platform may include a user interface, and a controller communicatively coupled to each the plurality of subsystems. The controller may receive the data from the first subsystem and adjust, based on the received data, operation of the second subsystem. it should be appreciated that the environment may or may not include the photovoltaic panel and/or the power supply. Additionally and/or alternatively, the power may be supplied to the power supply by the photovoltaic panel or another energy supplier, such as a generator, an electrical grid, and/or the like.

In some aspects, the first subsystem and the second subsystem are each configured to communicate with the energy management platform. The first subsystem is configured to not communicate directly with the second subsystem.

In some aspects, the platform is a single central platform configured for communicating with each of the plurality of subsystems.

In some aspects, the platform includes one or more protocols that enable communication with each of the plurality of subsystems.

In some aspects, the user interface is configured to display the data received from each of the first subsystem and the second subsystem.

In some aspects, the first subsystem is associated with a first vendor and the second subsystem is associated with a second vendor.

In some aspects, the adjusting includes disabling the second subsystem.

In some aspects, the controller is further configured to: display, based on the data and via the user interface, an indication includes one or more of a status alert, a report, and a recommendation.

In some aspects, the system also includes a third subsystem of the plurality of subsystems, The third subsystem is a solar management subsystem that includes the photovoltaic panel and a solar production monitor configured to determine a solar load generated by the photovoltaic panel. The system also includes a fourth subsystem of the plurality of subsystems. The fourth subsystem is a building load management subsystem that includes a building load monitor configured to determine a building load consumed by one or more building systems of the building load management subsystem. The first subsystem is a battery management subsystem that includes: the power supply and a voltage monitor coupled to the power supply. The voltage monitor is configured to determine a voltage provided by the power supply. The second subsystem is a power generator. The data includes the voltage.

In some aspects, the adjusting includes: determining the voltage from the battery management subsystem meets a threshold voltage, retrieving, in response to the determination that the voltage is less than the threshold voltage, the solar load from the solar management subsystem and the building load from the building load management subsystem, and comparing the solar load to the building load.

In some aspects, the adjusting further includes: determining the solar load is less than the building load and causing, based on the determining the solar load is less than the building load, activation of the power generator.

In some aspects, the adjusting further includes: retrieving, after causing activation of the power generator, an updated voltage from the battery management subsystem, determining the updated voltage meets an updated threshold voltage, and causing, based on the determination the updated voltage meets the updated threshold voltage, deactivation of the power generator.

In some aspects, the first subsystem is a ground resistance monitoring subsystem configured to measure a ground rod resistance of a ground rod positioned within an area of a ground. The second subsystem is an irrigation subsystem. The data includes the ground rod resistance.

In some aspects, the adjusting includes: determining the ground rod resistance retrieved from the ground resistance monitoring subsystem meets a threshold ground rod resistance, and causing, based on the determination the ground rod resistance meets the threshold ground rod resistance, activation of the irrigation subsystem to wet the area of the ground in which the ground rod is positioned.

In some aspects, the adjusting further includes: retrieving, after causing activation of the irrigation subsystem, an updated ground rod resistance from the ground resistance subsystem, determining the updated ground rod resistance is below an updated threshold ground rod resistance, and causing, based on the determination the updated ground rod resistance is below the updated threshold ground rod resistance, deactivation of the irrigation subsystem.

In some aspects, the first subsystem is a solar management subsystem that includes the photovoltaic panel, and a current monitor configured to monitor an amperage generated by the photovoltaic panel. The data includes the amperage.

In some aspects, the adjusting further includes: determining the amperage received from the solar management subsystem is less than a threshold amperage, detecting, based on the determination the amperage is less than a threshold amperage, the photovoltaic panel is missing and/or defective, and transmitting, based on the detection, an alert.

In some aspects, the first subsystem is a non-hertzian power management subsystem configured to monitor a non-hertzian amperage within the energy environment. The data is the non-hertzian amperage.

In some aspects, the adjusting further includes: determining the non-hertzian amperage retrieved from the non-hertzian power management subsystem meets a threshold non-hertzian amperage, and causing, based on the determination, deactivation of power flow within the energy environment.

In some aspects, the system includes a third subsystem of the plurality of subsystems. The third subsystem is a battery management subsystem that includes: the power supply. The first subsystem is an HVAC/R subsystem includes an air conditioning compressor, and a thermostat configured to activate the air conditioning compressor. The second subsystem is a power generator. The data includes a request from the thermostat to activate the air conditioning compressor.

In some aspects, the adjusting further includes: determining, based on generator data received from the power generator, the power generator has been activated, and causing, based on the determination the power generator has been activated, a load for activating the air conditioning compressor to be moved from the power supply to the power generator.

In some aspects, the adjusting further includes: enabling, after causing the startup load to move to the power generator, the air conditioning compressor to be activated.

In some aspects, the adjusting further includes: receiving, from the HVAC/R subsystem, updated data that includes an indication the air conditioning compressor is no longer being requested to be activated, disabling, based on the updated data, the air conditioning compressor, causing, based on the disabling, the load to be moved from the power generator to the power supply, and deactivating, based on the causing, the power generator. The disabling includes turning off a relay of the HVAC/R subsystem.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 13 depicts an example method of monitoring and controlling a plurality of subsystems of an energy environment, in accordance with some example implementations.

When practical, similar reference numbers denote similar structures, features, or elements.

DETAILED DESCRIPTION

Figure 1A:
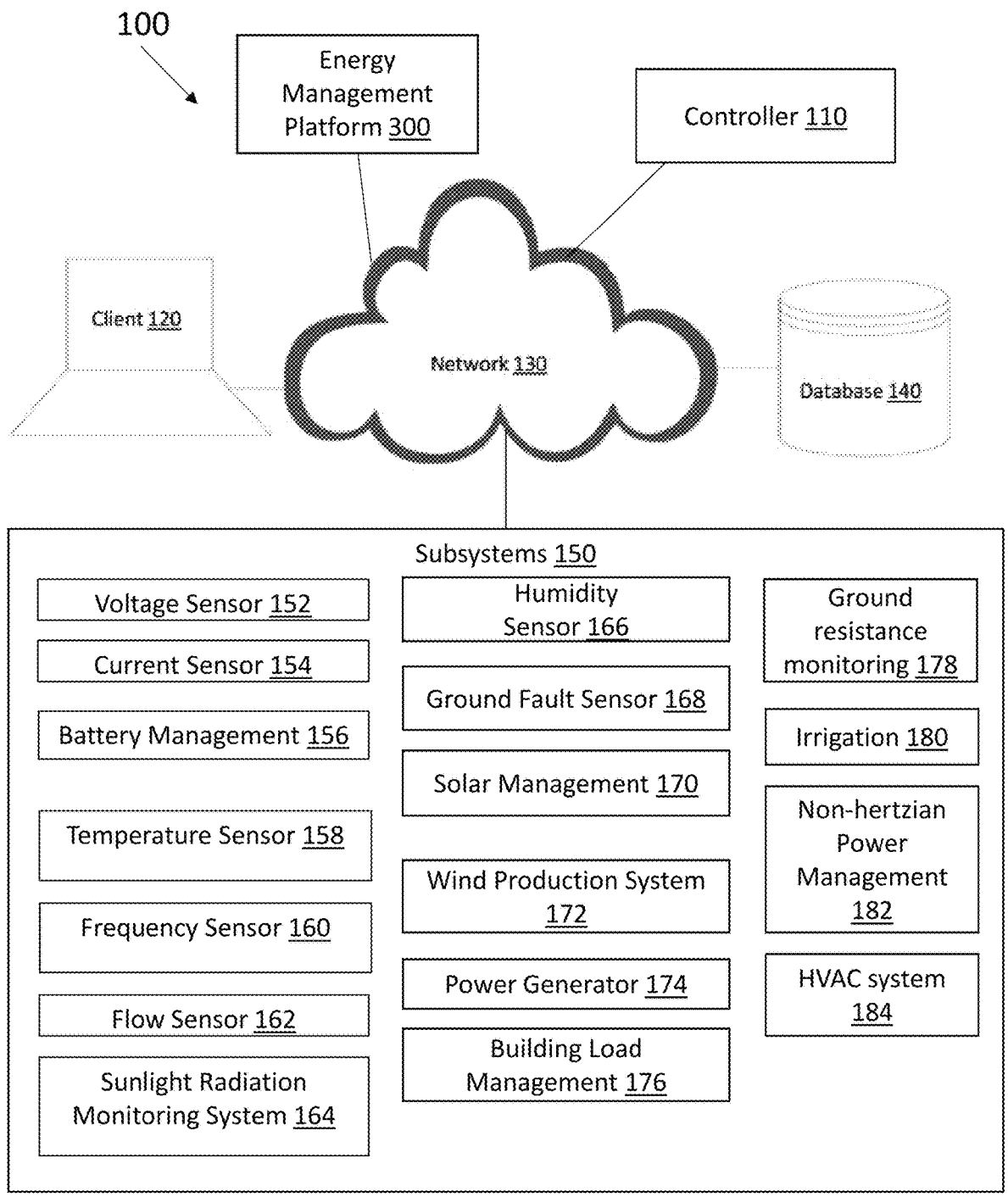
FIG. 1A depicts a system diagram illustrating an energy management system, in accordance with some example implementations.

The solar industry is plagued with failing and poorly performing solar systems. For example, a building or other residential or commercial facilities may have a number of subsystems that use and/or monitor energy, such as solar energy generated by the solar systems. However, each of those subsystems are generally independently operated and cannot communicate with one another. For example, each of the subsystems can only be accessed by trained professionals and the independent vendors operating the particular subsystem. Conventionally, there has also been no way for each subsystem to communicate with one another and/or be centrally controlled. As a result, the subsystems have generally operated independently, without regard to measurements and/or operations of other subsystems. The fragmented approach to monitoring and controlling the various subsystems in such an environment leads to poorly performing and failing solar and battery management systems. Also, an error or failure in one subsystem may cause damage to another subsystem. For example, when an error or failure in one subsystem arises, professionals from each different vendor may be relied on to communicate to first determine the issue or detect the stress point in the system, and then work together to solve the issue and to restore the system. This can result in a lengthy process, consuming a significant amount of resources, and inefficiently and ineffectively resolving the issues in the systems (e.g., the solar systems and battery management systems). Thus, the disjoined approach to managing solar and battery management systems may lead to damaged equipment, equipment failure, poor energy efficiency, a significant amount of system downtime, and/or the like.

The energy management system consistent with implementations of the current subject matter includes a central energy management platform. The energy management platform may communicate with, monitor, and/or control various aspects of each of the subsystems in the solar or battery management system (e.g., the energy management system). This allows for the energy management platform to receive data from a first subsystem and adjust operation of at least a second subsystem, based on the data received from the first subsystem. As a result, the energy management platform is able to, in real time, monitor and manage (e.g., track, access, control, and/or the like) the entire energy environment through a single platform, rather than through the use of the fragmented approach in which data from one subsystem could not be used by another subsystem, and in which separate independent monitors are used. The energy management platform may also take into account environmental conditions, loads, temperatures, solar insolation, wind information, and/or other data when monitoring and/or controlling each of the subsystems in the energy management system. The energy management system may adjust operations based on the environmental conditions within the energy environment in addition to the measurements of the separate subsystems, to control operations of and/or loads on each of the subsystems.

The energy management platform consistent with implementations of the current subject matter improves performance of the energy management system, such as the solar and/or battery management systems, improves efficiency and longevity of solar and/or battery management systems, and/or reduces degradation in those systems. The energy management platform consistent with implementations of the current subject matter is also able to use its ability to communicate with each of the subsystems to automatically and independently control various aspects of the energy management system and to resolve or prevent issues in each of the subsystems of the energy management system. For example, the energy management platform consistent with implementations of the current subject matter may provide an overview of the energy management system to help prevent failure of any one of the energy subsystems described herein.

FIG. 1A depicts a system diagram illustrating an energy management system 100, in accordance with some example implementations. Referring to FIG. 1A, the energy management system 100 may include an controller 110, an energy management platform 300, a client 120, a database 140, and a plurality of subsystems 150. As shown in FIG. 1A, the controller 110, the energy management platform 300, the client 120, the database 140, and the plurality of subsystems 150 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like.

The database 140 may be any type of database including, for example, a graph database, an in-memory database, a relational database, a non-relational (NoSQL) database, and/or the like. The database 140 may include one or more (e.g., one, two, three, four, five, or more) databases. The database 140 may store data received by the controller 110, the client 120, the energy management platform, and/or the plurality of subsystems 150. The database 140 may additionally and/or alternatively store data tracked and/or generated by the plurality of subsystems 150, the controller 110, and/or the energy management platform 300.

In some implementations, the client 120 may be a mobile device including, for example, a smartphone, a tablet computer, a wearable apparatus, and/or the like. However, it should be appreciated that the client 120 may be any processor-based device including, for example, a laptop computer, a workstation, and/or the like. In some implementations, the client 120 includes an application, such as a mobile application, which may be a type of application software configured to run on a mobile device or any processor-based device. Moreover, the application of the client may be a web application configured to provide access, at the client 120, to the energy management platform 300. In some embodiments, the client 120 includes a graphical user interface. For example, FIG. 1B depicts an example graphical user interface or energy display 2000, consistent with implementations of the current subject matter, that may be displayed via the client 120.

The user may interact with the graphical user interface. Additionally or alternatively, generated visualizations and/or alerts may be presented via the graphical user interface. As used herein, a "visualization" may include data presentations such as, for example, tables, charts, graphs, diagrams, plots, and/or the like. The visualization may display reports, advanced analytics, and/or the like.

Consistent with implementations of the current subject matter, the energy management platform 300 may communicate with, monitor, and/or control various aspects of each of the subsystems 150. This allows for the energy management platform 300 to receive data from a first subsystem of the subsystems 150 and adjust operation of at least a second subsystem of the subsystems 150, based on the data received from the first subsystem. Additionally, the client 120 may form a part of and/or define at least a part of the energy management platform 300. For example, the energy management platform 300 may include the user interface. Thus, a user may access the energy management platform 300 via the user interface. The energy management platform 300 may additionally and/or alternatively provide information from each of the plurality of subsystems 150 and/or visualizations generated based on the information, via the user interface.

Figure 1B:
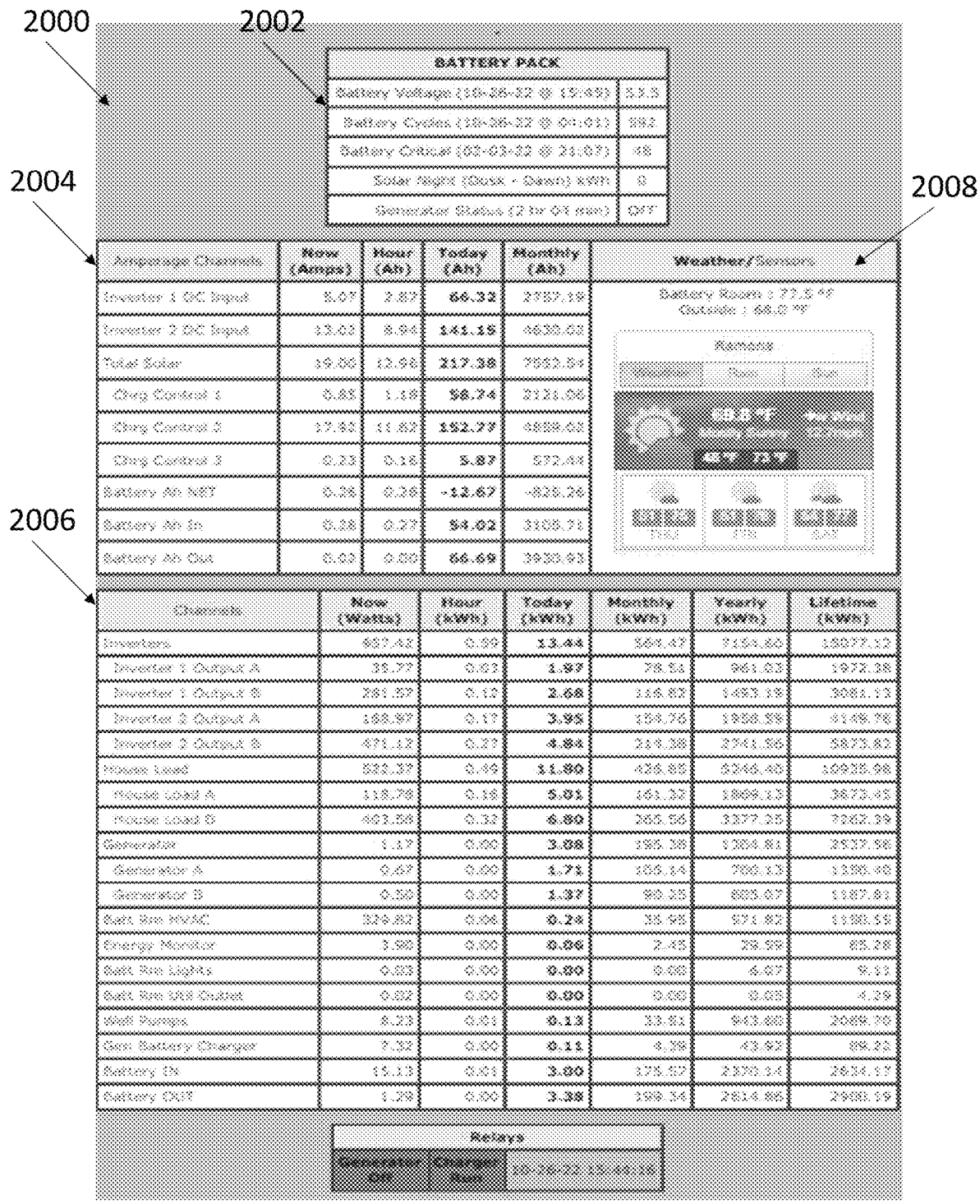
FIG. 1B depicts an example user interface for an energy management system, in accordance with some example implementations.

For example, referring to FIG. 1B, the energy display 2000 may depict an overview of each of the subsystems of the energy management system 100. In particular, the energy management system 100 (e.g., the controller 110) may generate and display, via the energy display 2000, battery information 2002 corresponding to at least a battery management subsystem 156 (described in more detail below), amperage information 2004, and energy information 2006. The battery information 2002, the amperage information 2004, and the energy information 2006 may be generated based on the plurality of subsystems 150 and/or the associated workflows described herein.

Referring to FIG. 1B, the battery information 2002 may include a battery voltage, a quantity of battery cycles, a quantity of battery critical levels, a status of a power generator 174 (described in more detail below), and/or the like. The battery information 2002 may also include an associated time stamp indicating the last check of the battery information 2002 and/or the day and/or time of a previous battery-related event, such as a time stamp associated with the battery reaching a critical level. The controller 110 collects and/or generates battery information 2002 for displaying at the energy display 2000 based on communication with one or more of the plurality of subsystems 150. The battery information 2002 allows for monitoring of the battery (e.g., power supply) within the energy environment 350 (see FIG. 3) and may help to prevent failure of the battery within the energy environment 350. The battery information 2004 may be determined by monitoring the plurality of subsystems 150 and/or via one or more of the workflows described herein, such as the workflows 400, 500, 600, 700, 800, 900, 1100, and/or the like. Accordingly, the ability for the controller 110 to communicate with the otherwise independently operated plurality of subsystems 150 allows for prevention of failure of the battery and helps to maintain operation of the energy management system 100. Such configurations may also allow for the controller 110 to control one or more subsystems of the plurality of subsystems 150 based on the battery information 2002.

Again referring to FIG. 1B, the amperage information 2004 includes an amperage generated by the controller 110 based on the plurality of subsystems 150 and/or an amperage collected from the monitored plurality of subsystems 150. The amperage information 2004 may include an amperage associated with one or more channels, such as an inverter DC input, a total solar amperage, a battery amperage input, a battery amperage net, a battery amperage output and/or the like. The amperage information 2004 may include a current amperage, an hourly total amperage (e.g., amps per hour), a daily total amperage (e.g., amps per hour), a monthly total amperage (e.g., amps per hour), and/or the like. The amperage information 2004 may be determined by monitoring the plurality of subsystems 150 and/or via one or more of the workflows described herein, such as the workflows 400, 500, 600, 700, 800, 900, 1100, and/or the like. Accordingly, the amperage information 2004 shows a current state of the amperage of the plurality of subsystems 150 and/or a total amperage of the plurality of subsystems 150 over time. This allows for improved monitoring of the operation of the plurality of subsystems 150 within the overall energy environment 350, and helps to prevent or reduce failure of any component of the plurality of subsystems 150 based on loads on the plurality of subsystems 150, the battery, and/or the like.

Again referring to FIG. 1B, the energy information 2006 includes a watts or kilowatts per hour generated by the controller 110 based on the plurality of subsystems 150 and/or an energy consumption (e.g., wattage) collected from the monitored plurality of subsystems 150. The energy information 2006 may include a wattage (e.g., in watts) or a generated energy usage (e.g., in kilowatts per hour) associated with one or more channels, such as an inverter output, a house load, a generator output, an energy monitor, a battery supporting HVAC/R systems, a battery supporting lighting, a battery supporting outlets, well pumps, a generator battery charger, a battery electricity in (e.g., voltage, energy, etc.), a battery electricity out (e.g., voltage, energy, etc.) and/or the like. The energy information 2006 may include a current wattage, an hourly total kilowatts per hour, a daily total kilowatts per hour, a monthly total kilowatts per hour, and/or the like. The energy information 2006 may be determined by monitoring the plurality of subsystems 150 and/or via one or more of the workflows described herein, such as the workflows 400, 500, 600, 700, 800, 900, 1100, and/or the like. Accordingly, the energy information 2006 shows a current state of the energy of the plurality of subsystems 150 and/or a total kilowatts per hour consumed by the plurality of subsystems 150 over time. This indicates the load on one or more of the plurality of subsystems 150 and allows the controller 110 to adjust operation of the one or more subsystems 150 to account for the load on each of the subsystems 150. Additionally and/or alternatively, this allows for improved monitoring of the operation of the plurality of subsystems 150 within the overall energy environment 350, and helps to prevent or reduce failure of any component of the plurality of subsystems 150 based on loads on the plurality of subsystems 150, the battery, and/or the like.

Again referring to FIG. 1B, the energy display 2000 may display environmental conditions 2008 monitored by the energy management system 100 (e.g., the controller 110). The environmental conditions 2008 may include the current, daily, and future weather forecast, an air temperature in the energy environment 350, a current or predicted sun exposure within the energy environment 350, a current or predicted precipitation forecast within the energy environment 350, a predicted or measured wind speed within the energy environment 350, and/or the like. The controller 110 may adjust operation of one or more of the plurality of subsystems 150 described herein based on the monitored environmental conditions shown at 2008 within the energy display 2000. For example, the controller 110 may predict whether the battery management subsystem will receive a sufficient amount of energy from the solar management subsystem, based at least on the environmental conditions 2008, and adjust operation of the battery management subsystem and/or another one of the plurality of subsystems 150 based on the prediction. Accordingly, this allows for improved monitoring of the operation of the plurality of subsystems 150 within the overall energy environment 350, and helps to prevent or reduce failure of any component of the plurality of subsystems 150.

In some implementations, the energy display 200 includes one or more selectable visual elements within the battery information 2002, the amperage information 2004, the energy information 2006, and/or the environmental conditions 2008 that can be selected via the client 120. Selection of the one or more selectable visual elements may provide further insights with respect to each channel and/or energy consumption or monitored information based on each channel.

Referring back to FIG. 1A, as described herein, the controller 110 may be coupled to or form a part of the energy management platform 300. The controller 110 may include at least one data processor and at least one memory storing instructions, which when executed by the at least one data processor, causes various operations. The controller 110 (e.g., as part of the energy management platform 300), may communicate with each of the plurality of subsystems 150 to monitor and/or control various aspects of each of the plurality of subsystems 150 and to adjust operation of at least one of the subsystems 150 based on data received from at least one other one of the subsystems 150. The controller 110 may additionally and/or alternatively communicate with the client 120, the energy management platform 300, and/or the database 140 to monitor and/or control various aspects of each of the plurality of subsystems 150 and to adjust operation of at least one of the subsystems 150 based on data received from at least one other one of the subsystems 150 and/or stored in the database 140.

The controller 110 and/or the energy management platform 300 may simultaneously monitor data from each of the plurality of subsystems 150. For example, the controller 110 and/or the energy management platform 300 may monitor usage from the subsystems 150 by the minute, day, week, month, and/or year. Additionally and/or alternatively, the controller 110 and/or the energy management platform 300 may provide time of use segmentation of usage by each subsystem 150. For example, the battery information 2002, the amperage information 2004, the energy information 2006, and/or the like, including the monitored or determined usage with respect to various channels and/or subsystems 150 over time may be displayed via the energy display 2000. The energy display 2000 may thus provide a visualization of the data monitored and/or determined by the energy management platform 300.

Figure 3:
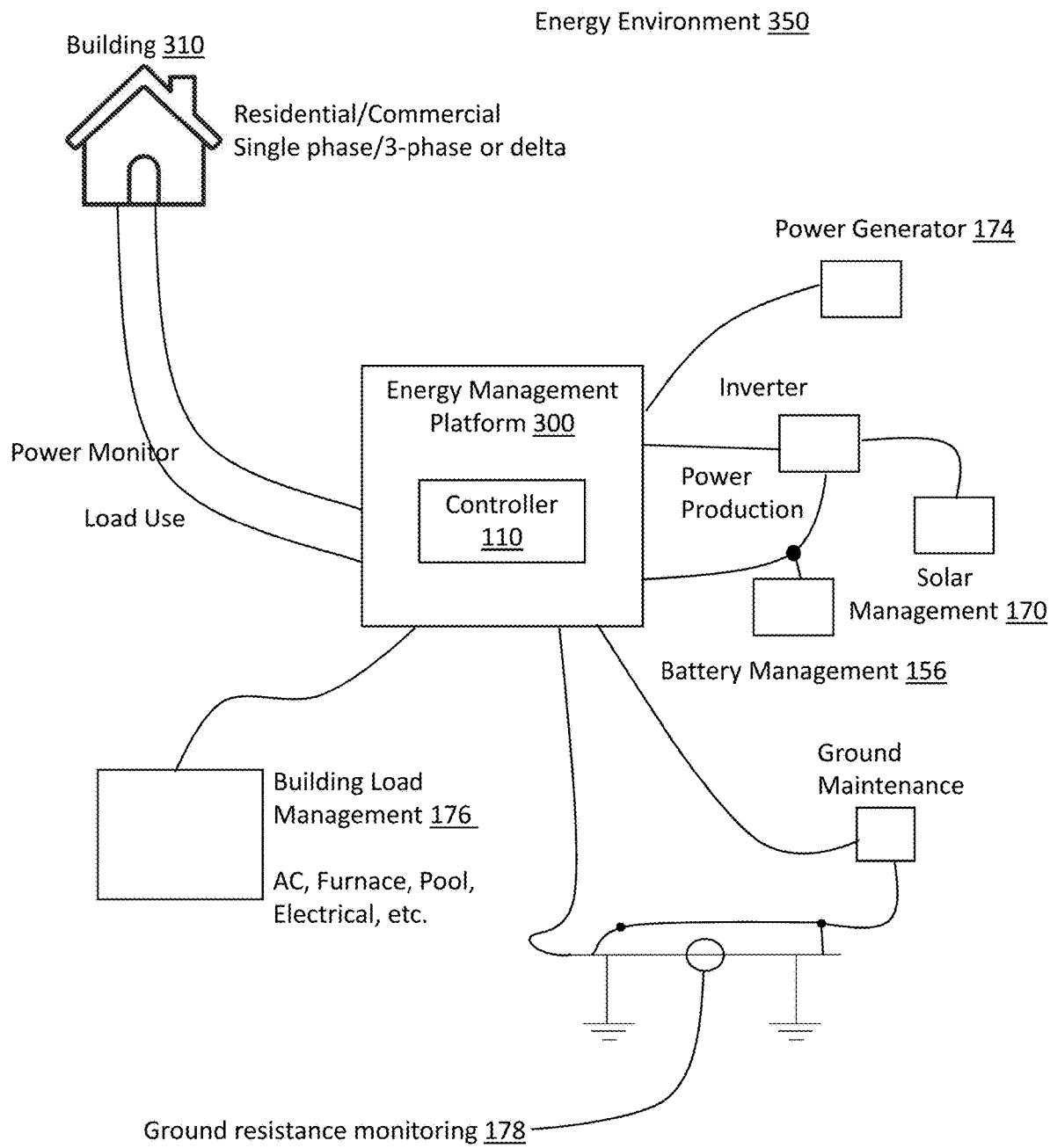
FIG. 3 depicts a system diagram of an energy environment, in accordance with some example implementations.

The plurality of subsystems 150 may include various subsystems of an energy environment 350 (see FIG. 3). Each of the plurality of subsystems 150 may communicate with one another via the energy management platform 300 and/or the controller 110. The plurality of subsystems 150 may additionally and/or alternatively receive environmental conditions, such as via the controller 110, to adjust operation of the plurality of subsystems 150.

The plurality of subsystems 150 may be associated with a building, such as a commercial or residential building. As described herein, a building can include a structure with a roof and/or walls, a facility, a power plant, a solar farm, a farm, an RV, a multi-story building, industrial complex, land surrounding the structure, and/or the like.

Additionally and/or alternatively, the plurality of subsystems 150 may each be coupled to an associated relay. The relay may include a switch that opens and closes circuits of the subsystems 150 electromechanically or electronically. For example, the relays may communicate with the energy management platform 300 and/or the controller 110. The relay may receive instructions from the energy management platform and/or the controller 110 to activate and/or deactivate one or more of the sensors, monitors, and/or subsystems 150 described herein.

In some instances, at least one of, or each of the plurality of subsystems 150 and/or components of the plurality of subsystems 150, is provided by a different vendor. The energy management platform 300 may communicate with each of the subsystems 150 regardless of the vendor providing the subsystem 150.

The plurality of subsystems 150 may include a first subsystem, a second subsystem, a third subsystem, and so on. For example, the plurality of subsystems 150 may include one or more of: a voltage sensor 152, a current sensor 154, a battery management subsystem 156, a temperature sensor 158, a frequency sensor 160, a flow sensor 162, a sunlight radiation monitoring system 164, a humidity sensor 166, a ground fault sensor 168, a solar management subsystem 170, a wind production system 172, a power generator 174, a building load management subsystem 176, a ground resistance monitoring subsystem 178, an irrigation subsystem 180, a non-hertzian power management subsystem 182, a heating, ventilation, air conditioning and refrigeration (HVAC/R) subsystem 184, ground fault monitors, power monitors, other sensors, monitors, relays, and/or the like. While generally these subsystems have been previously unable to communicate with one another, the energy management platform 300 and/or the controller 110 may communicate with and/or control each of the subsystems 150.

In some implementations, the voltage sensor 152 monitors and/or records voltages throughout various systems of the energy environment 350. For example, the voltage sensor 152 may monitor a voltage of a power supply. The current sensor 154 may monitor and/or record currents throughout various systems of the energy environment 350. For example, the current sensor 154 may monitor a current of a power supply, and/or the like. The temperature sensor 158 may monitor a temperature of a subsystem of the plurality of subsystems 150. The frequency sensor 160 may monitor a frequency in a subsystem of the plurality of subsystems 150. The flow sensor 162 may monitor a flow rate of a gas, fluid, and/or the like in a subsystem of the plurality of subsystems 150. The sunlight radiation monitoring system 164 may monitor a sunlight radiation level. The humidity sensor 166 may monitor a humidity. The ground fault sensor 168 may measure a ground fault level. The sensors described herein may monitor and/or record data and provide the data to the energy management platform 300 and/or the controller 110.

The battery management subsystem 156 may include a power supply configured to store energy generated from a photovoltaic panel (e.g., a solar panel and/or the like) and provide the stored energy to another one of the subsystems 150. The battery management subsystem 156 may also include a voltage monitor to monitor a voltage of the energy stored by the power supply, a current monitor to monitor a current of the energy stored by the power supply, an inverter, and/or the like. Thus, the battery management subsystem 156 may provide data associated with the battery management system to the energy management platform 300 and/or the controller 110. In some implementations, the battery management subsystem 156 provides the voltage and amperage of the power supply to the energy management platform 300. This allows the energy management platform to confirm that the power supply is actually charged. For example, generally, a charge controller can cause charging of the power supply and an inverter can be coupled to the power supply to deliver the power from the power supply. However, the charge controller or the inverter coupled to the power supply may, on its own, be unable to determine whether the power supply is actually charged, since the charge controller, the power supply, and/or the inverter may be provided by different vendors. Based on the received voltage and current, the energy management platform 300 can determine whether the power supply is actually charged, and/or the status of the charging of the power supply.

As described herein, if the controller 110 determines the power supply is insufficiently charged, the controller 110 can communicate with another subsystem 150, such as the power generator 174 to supply power to the power supply. As another example, with respect to the battery management subsystem 156, as shown in the energy display 2000, the battery management subsystem 156 may determine an overall amount of energy being supplied to the battery (e.g., the input battery in channel of the energy information 2006) and an overall amount of energy being outputted by the battery (e.g., the output battery out channel of the energy information 2006) within the energy environment 350. The controller 110 is able to determine the overall energy input and output (e.g., in kilowatts per hour) for the overall energy environment 350 at least because the controller 110 is able to communicate with and/or adjust operation of the plurality of subsystems 150. Accordingly, based on the determined overall energy input and/or the overall energy output, the controller 110 may adjust operation of the battery management subsystem 156, the power generator 174, the solar management subsystem 170, and/or the like to ensure that the battery can sufficiently support the load requirements of the energy management system 100 within the energy environment 250.

The solar management subsystem 170 may include a photovoltaic panel (e.g., a solar panel, and/or the like), a solar production monitor for determining a solar load generated by the photovoltaic panel, a current monitor to monitor an amperage generated by the photovoltaic panel, an inverter for converting the direct current (DC) electricity generated by the photovoltaic panel to alternating current (AC) electricity for supplying another one of the subsystems 150, and/or the like. The solar management subsystem 170 may thus generate electricity (e.g., the solar load) from solar energy and provide the generated electricity to another one of the subsystems 150. Thus, the solar management subsystem 170 may provide data associated with the solar management system to the energy management platform 300 and/or the controller 110.

The wind production system 172 may include a wind turbine (or another wind energy generator) and a wind production monitor for monitoring the wind energy produced by the wind turbine, and/or other aspects of the wind turbine. Thus, the wind production subsystem 172 may provide data associated with the wind production to the energy management platform 300 and/or the controller 110.

The power generator 174 may generate electricity (e.g., a load) to power another one of the subsystems 150. The power generator 174 may include a fuel sensor for monitoring a fuel level of the power generator 174. The power generator 174 may be a backup to the battery management subsystem 156, the solar management subsystem 170, the building load management subsystem 176, and/or other subsystems 150. The power generator 174 may provide data associated with the battery management system to the energy management platform 300 and/or the controller 110.

The building load management subsystem 176 may include a building load monitor configured to determine a building load consumed by one or more building systems (HVAC/R, furnace, pool, electrical, etc.) of a building. The building load management subsystem 176 may provide data associated with the building load to the energy management platform 300 and/or the controller 110.

The ground resistance monitoring subsystem 178 may monitor a ground resistance of a ground rod positioned within an area of a ground. The ground resistance monitoring subsystem 178 may also include a ground fault sensor. The ground resistance monitoring subsystem 178 may provide data associated with the ground resistance to the energy management platform 300 and/or the controller 110.

Then irrigation subsystem 180 may include an irrigation mechanism to wet the ground in the energy environment 300. The irrigation subsystem 180 may provide data to and/or be controlled by the energy management platform 300 and/or the controller 110.

The non-hertzian power management subsystem 182 may receive a non-hertzian current or amperage and/or monitor a non-hertzian current or amperage. The non-hertzian power management subsystem 182 may provide the non-hertzian current or amperage to the the energy management platform 300 and/or the controller 110.

Then HVAC/R subsystem 184 may include a furnace, an air conditioning compressor for providing cool air, a thermostat configured to activate the furnace and/or the air conditioning compressor, a monitor configured to monitor the furnace, the air conditioning compressor, and/or the thermostat, and/or the like. Thus, the HVAC/R subsystem 184 may provide data associated with the HVAC/R system of a building to the energy management platform 300 and/or the controller 110. While HVAC/R subsystem is referred to herein as a heating, ventilation, air conditioning, and refrigeration subsystem, the HVAC/R subsystem 184 may include one or more of the heating, ventilation, air conditioning, and refrigeration subsystem aspects.

In some implementations, the plurality of subsystems 150 includes a hot water management subsystem. The hot water management subsystem may be coupled to and/or communicate with another one of the plurality of subsystems 150, such as the solar management subsystem 170. For example, the hot water management subsystem may include water that is heated based on energy dissipating from the solar panels of the solar management subsystem 170. The water of the hot water management subsystem may additionally and/or alternatively be used to cool the solar panels of the solar management subsystem 170. The hot water management subsystem may, in some implementations, be adjusted by the controller 110, to provide additional heating of the water as needed within the energy environment 350.

Figure 2:
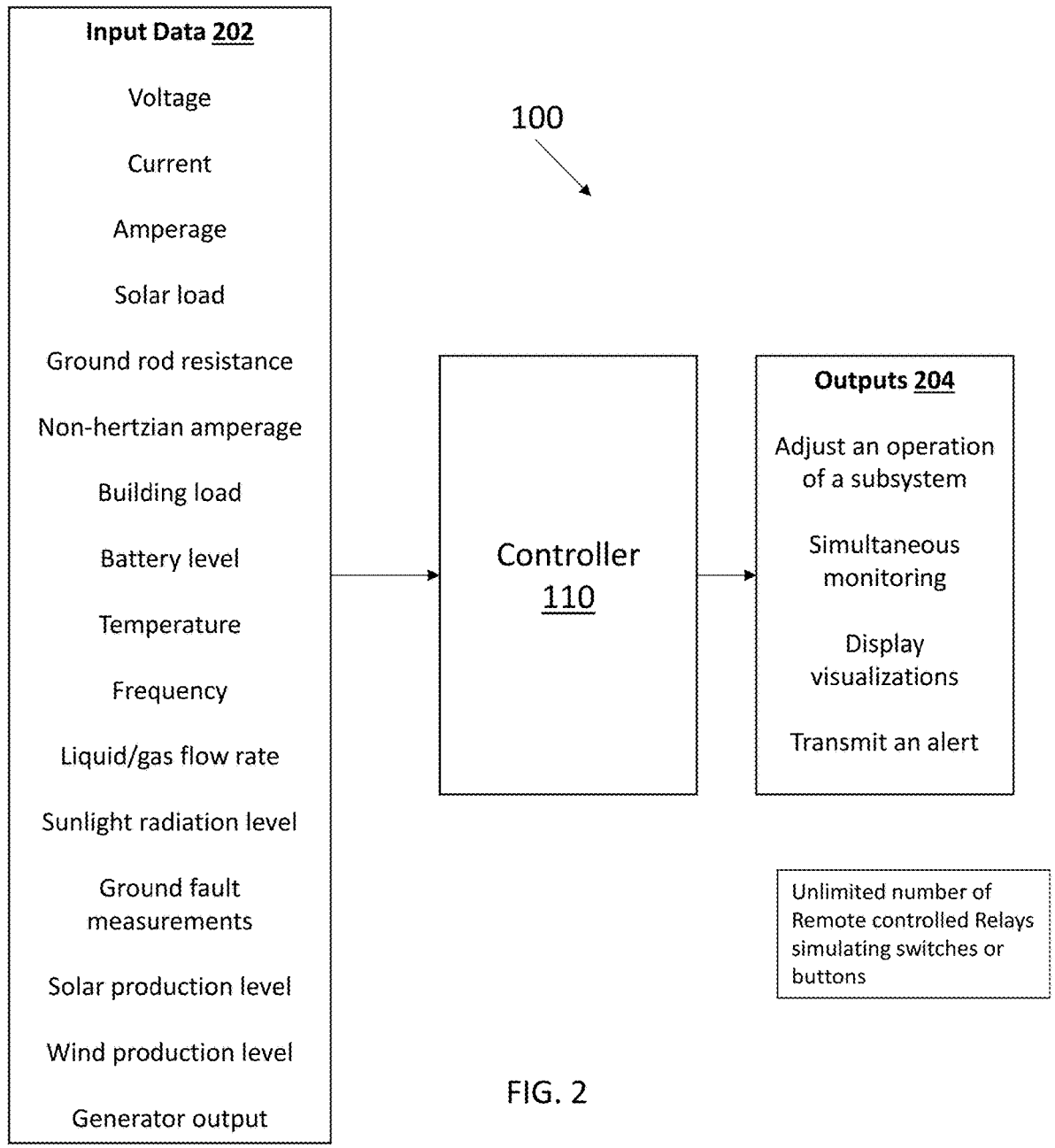
FIG. 2 depicts another system diagram of an energy management system, in accordance with some example implementations.

FIG. 2 depicts a flow diagram of the energy management system 100, consistent with implementations of the current subject matter. Consistent with implementations of the current subject matter, the controller 110 may receive data from each of the plurality of subsystems 150. For example, the controller 110 may receive input data 202, such as a voltage, a current, a amperage, a solar load, a ground rod resistance, a non-hertzian amperage, a building load, a battery level, a temperature, a frequency, a liquid/gas flow rate, a sunlight radiation level, a ground fault measurement, a solar production level, a wind production level, a generator output, a fan speed level, and/or the like. The controller 110 may adjust operation of one or more of the plurality of subsystems 150, based on the received data 202. For example, the controller 110 may at 204, adjust an operation of a subsystem 150, simultaneously monitor operations and/or data from at least one of the subsystems 150, display visualizations via the user interface of the energy management platform 300, transmit an alert (e.g., an audio alert, a visual alert, an audiovisual alert, a tactile alert, a report, a status update, and/or a recommendation to adjust an operation of a subsystem) to a client 120 and/or via the energy management platform 300. Additionally and/or alternatively, the controller 110 may communicate with one or more relays associated with each of the plurality of subsystems to control (e.g., activate and/or deactivate, and/or change a parameter of) at least one of the subsystems 150.

FIG. 3 illustrates an example energy environment 350, consistent with implementations of the current subject matter. The energy environment 350 includes the plurality of subsystems 150, the energy management platform 300 (including the controller 110), and a building 310 associated with the plurality of subsystems 150 and the energy management platform 300. The energy environment 350 may also include a solar system, such as at least one (one, two, three, four, five, or more, a string of, and/or the like) photovoltaic panel (e.g., a solar panel) and a battery system (e.g., of the battery management subsystem), such as a power supply configured to store energy generated by the photovoltaic panel. The energy environment 350, including the environmental conditions within the energy environment 350, may be monitored and/or controlled by the energy management platform 300, consistent with implementations of the current subject matter.

FIGS. 4-11 illustrate example workflows for monitoring and/or controlling one or more subsystems of the plurality of subsystems 150, using the energy management platform 300, and in the energy environment 350. Consistent with implementations of the current subject matter, the energy environment 350 may include a solar system and/or a battery management system. Thus, the energy environment 350 may include one or more photovoltaic panels and/or one or more power supplies for storing energy generated by the one or more photovoltaic panels. As described herein, the controller 110 may form a part of the energy management platform 300 and may control, monitor, and/or communicate with each of the plurality of subsystems 150. Thus, while the workflows are described as being performed by the controller 110, the energy management platform 300 may perform each of the workflows.

Figure 4:
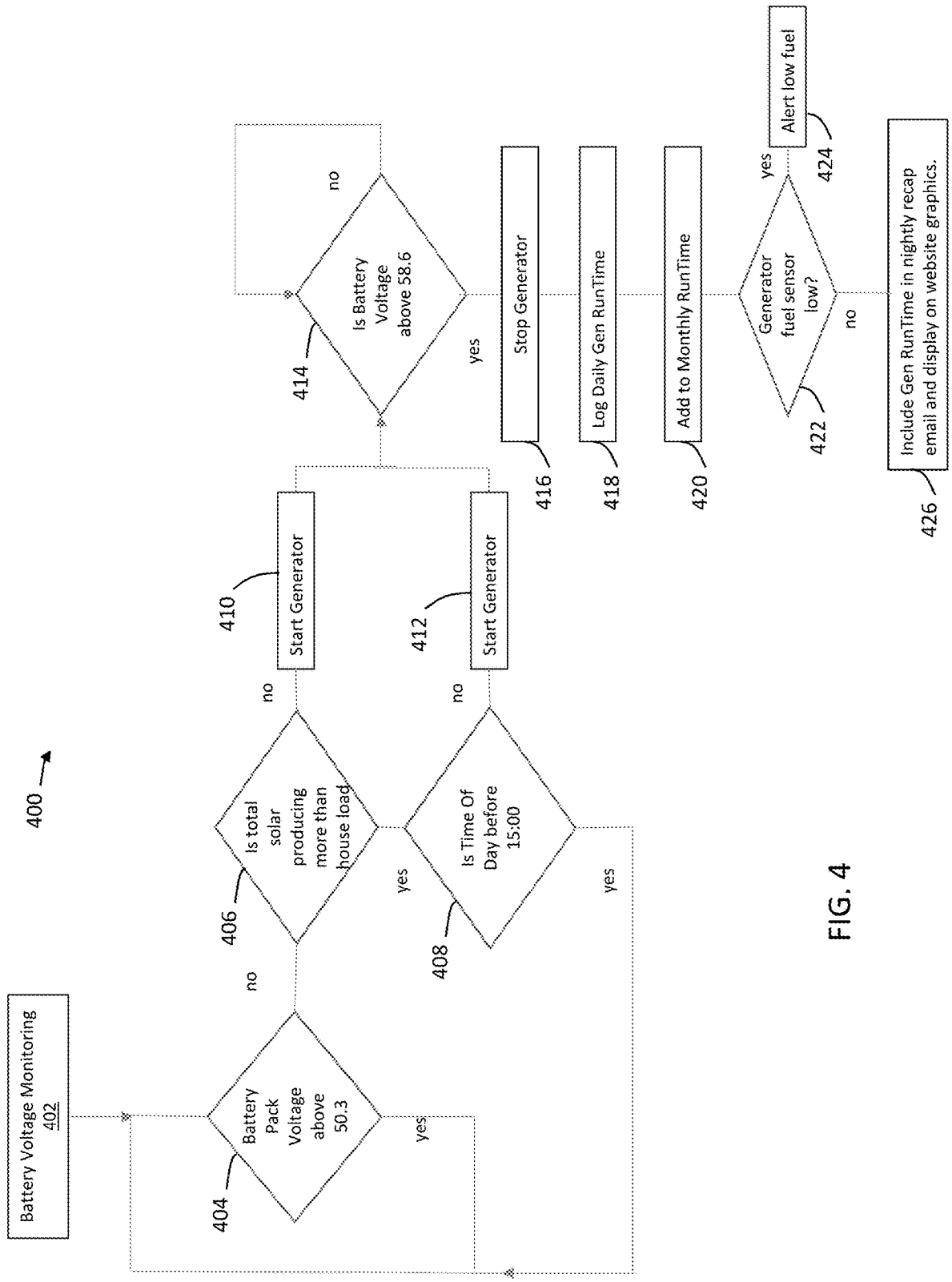
FIG. 4 depicts an example workflow for battery voltage monitoring, in accordance with some example implementations.

FIG. 4 depicts an example workflow 400 for battery voltage monitoring, consistent with implementations of the current subject matter. In this example, the controller 110 communicates with and/or controls at least a first subsystem of the plurality of subsystems, a second subsystem of the plurality of subsystems, a third subsystem of the plurality of subsystems, a fourth subsystem of the plurality of subsystems and/or the like. In this example, the first subsystem may be the battery management subsystem 156, the second subsystem may be the power generator 174, the third subsystem may be the solar management subsystem 170, and the fourth subsystem may be the building load management subsystem 176. Thus, the controller 110 may communicate with each of the battery management subsystem 156, the power generator 174, the solar management subsystem 170, the building load management subsystem 176, and/or another subsystem to control operation of the battery management subsystem 156, the power generator 174, the solar management subsystem 170, and the building load management subsystem 176, based at least on a state of and/or measurements received from the battery management subsystem 156, the power generator 174, the solar management subsystem 170, and the building load management subsystem 176.

At 402, the controller 110 may monitor a voltage of the power supply (e.g., battery) to ensure the power supply has sufficient energy to run one or more building systems of the building (e.g., the building 310). The controller 110 may receive a voltage from a voltage monitor or sensor of the battery management subsystem 156. For example, the voltage monitor or sensor of the battery management subsystem 156 may transmit the voltage to the controller 110.

At 404, the controller 110 may compare the received voltage to a threshold voltage. The threshold voltage may include 50.3 V, 40 to 45 V, 45 to 50 V, 50 to 55V, 55 to 60 V, lesser, greater, or other ranges therebetween. The controller 110 may determine the voltage from the battery management subsystem 156 meets (e.g., is greater than or equal to) the threshold voltage. When the controller 110 determines the voltage meets the threshold voltage, the controller 110 continues to retrieve and monitor updated voltages from the battery management system 156. In other words, the voltage monitor or sensor of the battery management subsystem 156 may continue to transmit voltages to the controller 110, such as based on a signal received from the controller 110.

The controller 110 may alternatively determine the voltage does not meet (e.g., is less than) the threshold voltage. In response to determining the voltage is less than the threshold voltage, the controller 110 retrieves a solar load (e.g., solar production) from the solar management subsystem 170 and a building load (e.g., building energy consumption) from the building load management subsystem 176. For example, the solar management subsystem 170 may transmit the solar load (e.g., a monitored and/or determined load) to the controller 110 and the building load management subsystem 176 may transmit the building load (e.g., a monitored and/or determined load) to the controller 110. At 406, the controller 110 compares the retrieved solar load to the building load.

If the controller 110 determines the solar load is greater than the building load, at 408, the controller 110 determines whether the time of day is before a predetermined time (e.g., 15:00, 11:00, 12:00, 13:00, 14:00, 16:00, 17:00, 18:00, and/or the like). When the controller 110 determines the time of day is before the predetermined time, such as 15:00, the controller 100 continues to monitor the voltage at 402. When the controller 110 determines the time of day is at or after the predetermined time (e.g., is not before the predetermined time), the controller 110 causes activation of the power generator 174 at 412. For example, the controller 110 may send a control signal to the power generator 174 and/or to a relay coupled to the power generator 174 to start the power generator 174. The power generator 174 may receive the control signal (e.g., directly from the controller 110 or via the relay) that causes the power generator 174 to be activated. Activating the power generator at 412 causes the power generator 174 to charge and/or supply power to the power supply of the battery management subsystem 156.

If the controller 110 determines the solar load is less than or equal to the building load, the controller 110 causes activation of the power generator 174 at 410. For example, the controller 110 may send a control signal to the power generator 174 and/or to a relay coupled to the power generator 174 to start the power generator 174. The power generator 174 may receive the control signal (e.g., directly from the controller 110 or via the relay) that causes the power generator 174 to be activated. Activating the power generator at 410 causes the power generator 174 to charge and/or supply power to the power supply of the battery management subsystem 156.

After activation (or causing activation) of the power generator 174 at 410 or 412, the controller 110 retrieves an updated voltage from the battery management subsystem 156. The updated voltage may be a voltage recorded at a later time compared to the voltage retrieved at 402.

At 414, the controller 110 may compare the received updated voltage to an updated threshold voltage. The updated threshold voltage may be 58.6 V, 45 to 50 V, 50 to 55V, 55 to 60 V, 60 to 65 V, lesser, greater, or other ranges therebetween. The controller 110 may determine the updated voltage from the battery management subsystem 156 meets (e.g., is greater than or equal to) the threshold voltage. When the controller 110 determines the voltage does not meet (e.g., is less than) the updated threshold voltage, the controller 110 continues to retrieve and monitor updated voltages from the battery management system 156. Additionally and/or alternatively, the battery management system 156 continues to transmit the voltages to the controller 110.

The controller 110 may alternatively determine the voltage does meet (e.g., is greater than or equal to) the updated threshold voltage. In response to determining the updated voltage is greater than or equal to the threshold voltage, the controller 110 causes deactivation of the power generator 174 at 416. For example, the controller 110 may send a control signal to the power generator 174 and/or to the relay coupled to the power generator 174 to stop the power generator 174. The power generator 174 may receive the control signal (e.g., directly from the controller 110 or via the relay) that causes the power generator 174 to be deactivated. Deactivating the power generator at 416 causes the power generator 174 to stop charging and/or supplying power to the power supply of the battery management subsystem 156.

At 418, the controller 100 may log the daily generator run time. The daily generator run time may include a total amount of time the generator was active during the day, a start and end time stamp, and/or the like. The stored run time may be displayed via the energy display 2000.

At 420. The controller 110 may add the daily generator run time to the monthly run time. For example, the controller 110 may store the daily generator run time in the database 140. At the database 140, the controller 110 may add the daily generator run time to the stored monthly run time. The stored run time may be displayed via the energy display 2000.

At 422, the controller 110 may communicate with the generator 174 and/or a monitor or sensor (e.g., fuel sensor) of the generator 174 to determine a fuel level of the generator 174. If the controller 110 determines the fuel level is low (e.g., is less than a threshold level), the controller 110, at 424, transmits an alert (e.g., a text, a report, a visual alert, an audio alert, an audiovisual alert, a tactile alert, and/or the like) via a user interface of the platform 300, to the client 120, and/or the like. The alert may be displayed via the energy display 2000. The controller 110 may additionally and/or alternatively generate and/or transmit via the platform 300 and/or the client 120, a recommendation to add fuel to the generator 174. The recommendation may be displayed via the energy display 2000. At 426, the controller may include the daily and/or monthly generator run time from the database 140 into a report, such as a nightly recap email and/or as part of a visualization on the user interface of the platform 300 and/or client 120. The daily and/or monthly generator run time may be displayed via the energy display 2000.

Figure 5:
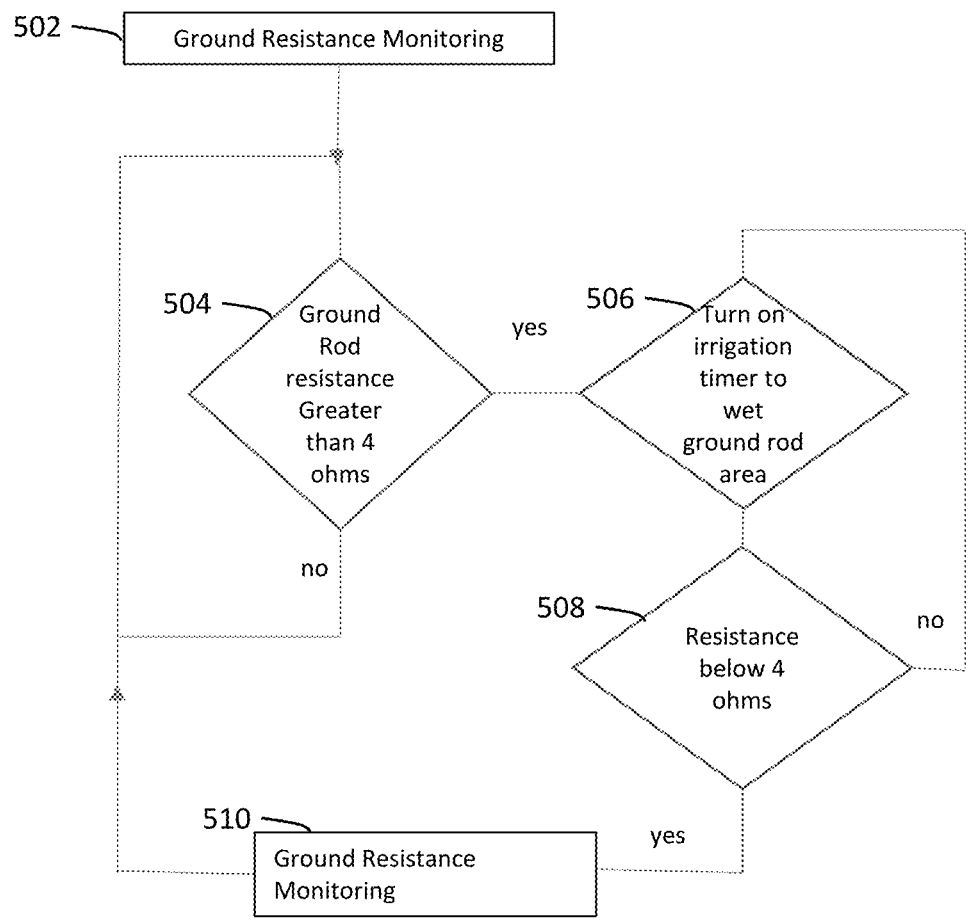
FIG. 5 depicts an example workflow for ground resistance monitoring, in accordance with some example implementations.

FIG. 5 depicts an example workflow 500 for ground resistance monitoring, consistent with implementations of the current subject matter. Generally, poor earth ground of any electrical system allows for electrical damage from electrical storms and power outages. For example, the ground resistance increases when the ground dries out. High ground resistance may cause damage to electrical equipment of the energy environment 350. Also, when the ground is dry and/or the ground resistance is high, eddy currents from electronics of the energy environment 350 may damage one or more components and/or subsystems of the energy environment 350. The energy management platform 300 may desirably monitor and/or prevent the ground resistance from getting too high, preventing or limiting damage to the electrical equipment.

In this example, the controller 110 communicates with and/or controls at least a first subsystem of the plurality of subsystems, a second subsystem of the plurality of subsystems, and/or the like. In this example, the first subsystem may be the ground resistance monitoring subsystem 178 and the second subsystem may be the irrigation subsystem 180. The ground rod resistance monitoring subsystem 178 may measure a ground rod resistance of a ground rod positioned within an area of a ground and the irrigation subsystem 180 may wet the area of the ground. Thus, the controller 110 may communicate with each of the ground resistance monitoring subsystem 178, the irrigation subsystem 180, and/or another subsystem to control operation of the ground resistance monitoring subsystem 178, the irrigation subsystem 180, based at least on a state of and/or measurements received from the ground resistance monitoring subsystem 178, the irrigation subsystem 180.

At 502, the controller 110 may monitor a ground resistance between ground rods (e.g., two ground rods) of the ground resistance monitoring subsystem 178. The controller 110 may receive a ground rod resistance from a resistance monitor or sensor of the ground resistance monitoring subsystem 178, coupled to the ground rods. The resistance monitor or sensor may transmit the ground rod resistance to the controller 110.

At 504, the controller 110 may compare the received ground rod resistance to a threshold resistance. The threshold resistance may be 4 ohms, 3 to 5 ohms, 5 to 7 ohms, 7 to 8 ohms, 8 to 10 ohms, 10 ohms, lesser, greater, or other ranges therebetween. The controller 110 may determine the ground rod resistance does not meet (e.g., is less than) the threshold resistance. When the controller 110 determines the ground rod resistance is less than the threshold resistance, the controller 110 continues to retrieve and monitor updated resistances from the ground rod resistance monitoring subsystem 178. The resistance monitor or sensor may continue to transmit the ground rod resistance to the controller 110.

The controller 110 may alternatively determine the ground rod resistance does meet (e.g., is greater than or equal to) the threshold resistance. This indicates that the resistance is too high and/or the ground is too dry. In response to determining the resistance is greater than or equal to the threshold resistance, at 506, the controller 110 causes activation of the irrigation subsystem 180 to wet the area of the ground in which the ground rod(s) is positioned. For example, the controller 110 may send a control signal to the irrigation subsystem 180 and/or to a relay coupled to the irrigation subsystem 180 to start the irrigation subsystem 180. The irrigation subsystem 180 may receive the control signal (e.g., directly from the controller 110 or via the relay) that causes the irrigation subsystem 180 to be activated.

After activation (or causing activation) of the irrigation subsystem 180 at 506, the controller 110 retrieves an updated ground rod resistance from the ground rod resistance monitoring subsystem 178. The resistance monitor or sensor may, in response, transmit the ground rod resistance to the controller 110. The updated ground rod resistance may be a resistance recorded at a later time compared to resistance retrieved at 502.

At 508, the controller 110 may compare the received updated resistance to a second threshold resistance, which may be the same as or different from the threshold resistance. The controller 110 may determine whether the updated resistance from the ground rod resistance monitoring subsystem 178 meets (e.g., is greater than or equal to) the second threshold resistance. When the controller 110 determines the updated resistance does not meet (e.g., is less than) the second threshold resistance, the controller 110 continues to retrieve and monitor updated resistances from the ground rod resistance monitoring subsystem 178. The resistance monitor or sensor may continue to transmit the ground rod resistance to the controller 110.

The controller 110 may alternatively determine the updated resistance does meet (e.g., is greater than or equal to) the second threshold resistance. In response to determining the updated resistance is greater than or equal to the threshold resistance, the controller 110 causes deactivation of the irrigation system 180. For example, the controller 110 may send a control signal to the irrigation system 180 and/or to the relay coupled to the irrigation system 180 to stop the irrigation system 180. The irrigation subsystem 180 may receive the control signal (e.g., directly from the controller 110 or via the relay) that causes the irrigation subsystem 180 to be deactivated. Deactivating the irrigation system 180 causes the irrigation system 180 to stop irrigating the area of the ground in which the ground rod is positioned. At 510, the controller 110 may continue to monitor the ground rod resistance at 502.

Figure 6:
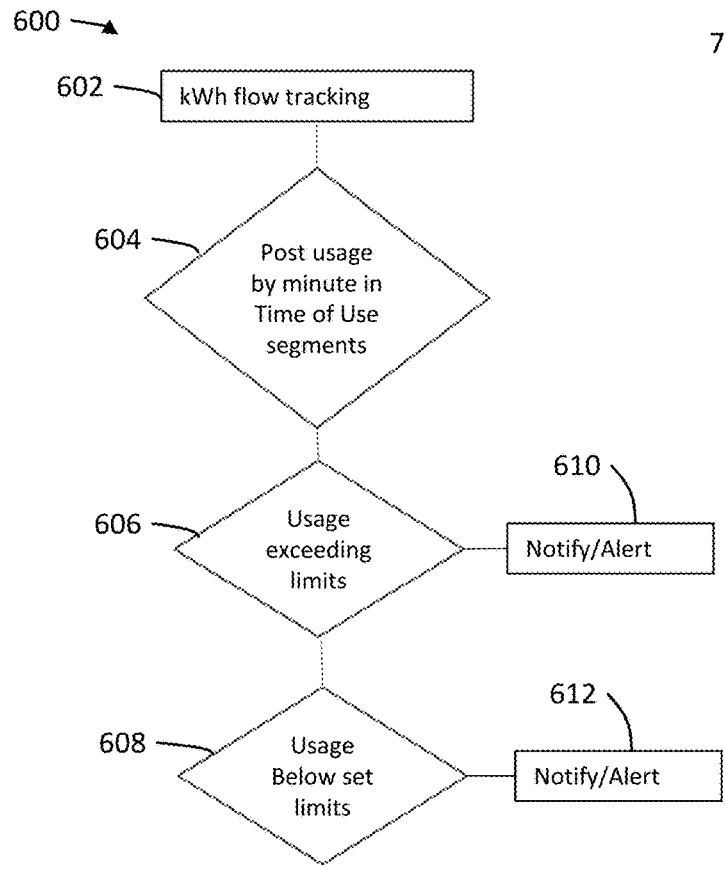
FIG. 6 depicts an example workflow for energy monitoring, in accordance with some example implementations.

FIG. 6 depicts an example workflow 600 for energy monitoring, consistent with implementations of the current subject matter. Using minute-to-minute visualizations of energy usage, for example, allows a user to test and/or track energy efficiency improvements resulting from, at least in part, the energy management platform 300 consistent with implementations of the current subject matter.

In this example, the controller 110 communicates with and/or controls at least a first subsystem of the plurality of subsystems, and/or the like. In this example, the first subsystem may be the building load management subsystem 176, which may include one or more energy usage sensors or monitors to measure an energy usage of various building systems of the energy environment 350.

At 602, the controller 110 may receive, from the building load management subsystem 176, time of use segments indicating an energy usage (e.g., building load). The controller 110 may cause, at 604, display of the received time of use segments via the energy management platform 300, the client 120, and/or the like. The time of use segments may be displayed via the energy display 2000.

At 606, the controller 110 may determine whether the energy usage exceeds a threshold usage limit. For example, the controller 110 may compare the received energy usage to a threshold energy usage. If the controller determines the usage is greater than or equal to the threshold usage limit, the controller 110 may, at 610, transmit an alert via the platform 300 and/or the client 120. The alert may include a status alert, an indication, a recommendation, an audio alert, a visual alert, an audiovisual alert, a tactile alert, and/or the like. The alert may be displayed via the energy display 2000. If the controller determines the usage is less than the threshold usage limit at 608, the controller 110 may, at 612, transmit an alert via the platform 300 and/or the client 120. The alert may include a status alert, an indication, a recommendation, an audio alert, a visual alert, an audiovisual alert, a tactile alert, and/or the like. The alert may be displayed via the energy display 2000.

Figure 7:
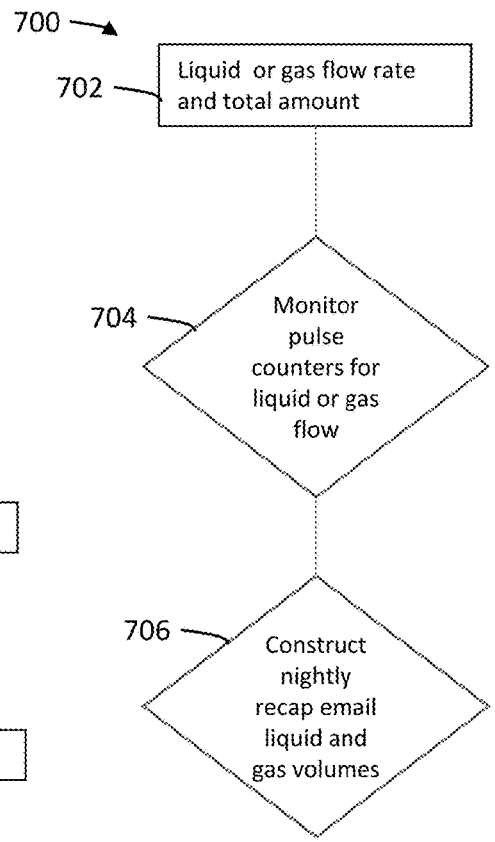
FIG. 7 depicts an example workflow for flow rate monitoring, in accordance with some example implementations.

FIG. 7 depicts an example workflow 700 for flow rate monitoring, consistent with implementations of the current subject matter. This allows for monitoring and/or controlling, via the platform 300, of a flow rate (e.g., a liquid and/or gas flow rate) through one or more subsystems 150 of the system 100 in the environment 350, such as in the building 310. Additionally and/or alternatively, such configurations allow for monitoring and/or controlling, via the platform 300, a total flow amount (e.g., liquid flow and/or gas flow) through one or more subsystems 150 of the system 100 in the environment 350, such as in the building 310.

In this example, the controller 110 communicates with and/or controls at least a first subsystem of the plurality of subsystems, and/or the like. In this example, the first subsystem may be the flow sensor 162, and/or the like, which may form a part of one or more other subsystems 150.

At 702, the controller 110 may receive, from the flow sensor 162, a flow rate and/or a total flow through one or more portions of the environment 350. At 704, the controller 110 may monitor pulse counters for liquid or gas flow, based on the received flow rate and/or total flow rate. At 706, the controller 110 may include flow rate and/or the total flow in a report, such as a nightly recap email and/or as part of a visualization on the user interface of the platform 300 and/or client 120. The flow rate and/or the total flow rate may be displayed via the energy display 2000.

Figure 8:
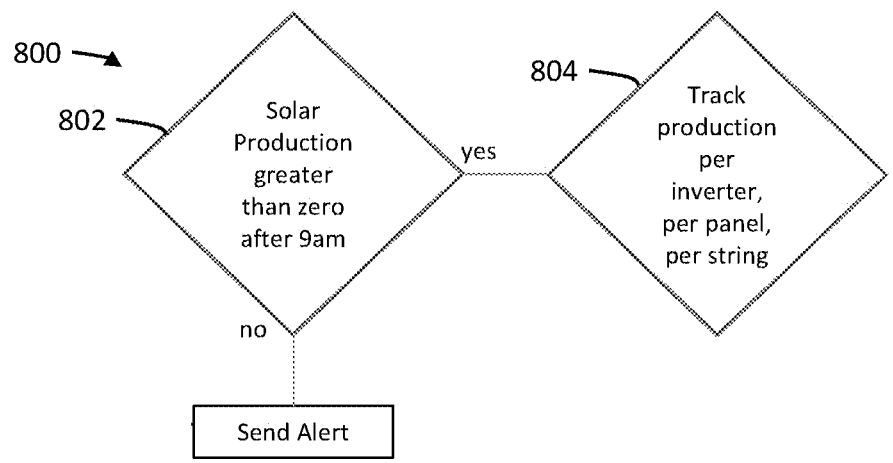
FIG. 8 depicts an example workflow for solar production monitoring, in accordance with some example implementations.
Figure 9:
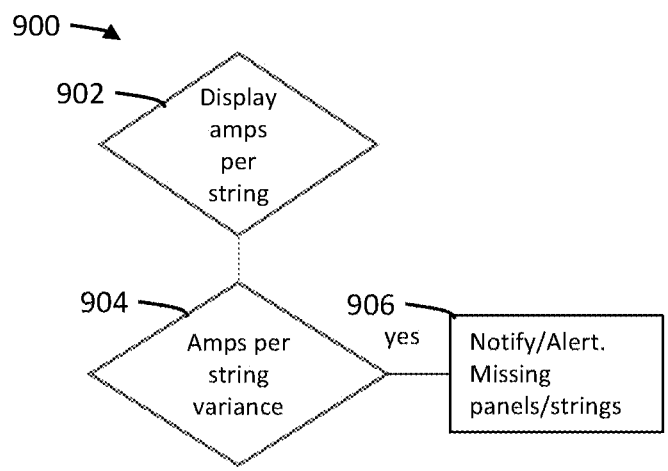
FIG. 9 depicts an example workflow for amperage monitoring, in accordance with some example implementations.

FIGS. 8 and 9 depict example workflows 800 and 900, respectively, for solar production monitoring, consistent with implementations of the current subject matter. The workflows 800 and 900 may help to determine whether the photovoltaic panels of the solar management subsystem 170 are functioning properly or whether at least one of the panels is failing.

In these examples, the controller 110 communicates with and/or controls at least a first subsystem of the plurality of subsystems, and/or the like. In this example, the first subsystem may be the solar management subsystem 170, a current sensor 154, and/or the like, but may depend on measurements and/or operations of one or more other ones of the plurality of subsystems described herein.

Referring to FIG. 8, at 802, the controller 110 may receive a solar load (e.g., energy production and/or generated) from the solar management subsystem 170. The controller 110 may compare the solar load to a threshold load, such as at a predetermined time. The threshold load may be zero amps. In other words, the controller 110 may determine whether the photovoltaic panels are generating energy at a predetermined time, such as 9 am, 6 am, 7 am, 8 am, 10 am, and/or the like. If the controller 110 determines the solar load is greater than or equal to the threshold, at the predetermined time, the controller 110, at 804 continues to track production of one or more components of the solar management subsystem 170, such as the inverters associated with each photovoltaic panel, each photovoltaic panel, each string of panels, and/or the like. If the controller 110 determines the solar load less than the threshold, such as at the predetermined time, the controller transmits an alert via the platform 300 and/or the client 120. The alert may include a status alert, an indication, a recommendation, an audio alert, a visual alert, an audiovisual alert, a tactile alert, and/or the like. The alert may be displayed via the energy display 2000.

Referring to FIG. 9, the controller may receive a current or amperage of the photovoltaic panels, such as each photovoltaic panel in a string of photovoltaic panels, from the solar management subsystem 170 and/or the current sensor 154 (which may be coupled to and/or form a part of the solar management subsystem 170). The current or amperage may be displayed as part of the amperage information 2002 at the energy display 2000. At 902, the controller displays, such as via a user interface of the platform 300, the received amperage. At 904, the controller may determine the amperage corresponding to a particular panel is less than a threshold amperage and thus, detects the corresponding photovoltaic panel is missing and/or defective. At 906, based on the determination, the controller 110 transmits an alert via the platform 300 and/or the client 120. The alert may include a status alert, an indication, a recommendation, an audio alert, a visual alert, an audiovisual alert, a tactile alert, and/or the like. The alert may be displayed via the energy display 2000.

Figure 10:
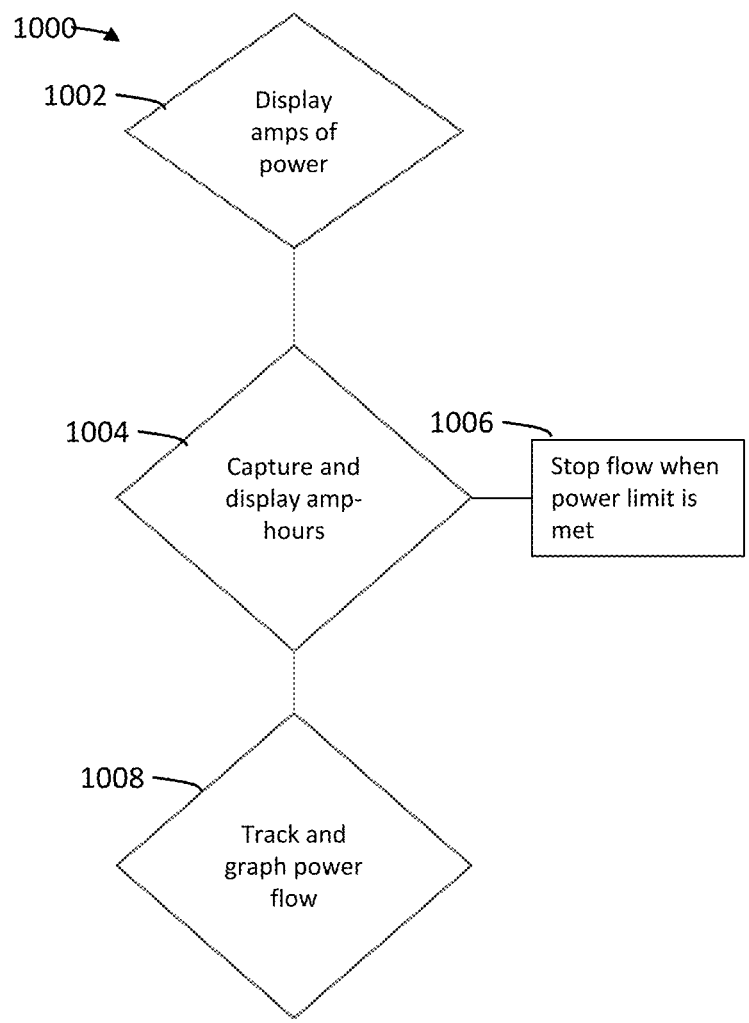
FIG. 10 depicts an example workflow for non-hertzian amperage monitoring, in accordance with some example implementations.

FIG. 10 depicts an example workflow 1000 for non-hertzian amperage monitoring, consistent with implementations of the current subject matter. Generally, systems may be unable to measure and/or track non-hertzian waveforms and/or amperage in a system. The platform 300 consistent with implementations of the current subject matter can monitor non-hertzian amperage and/or waveforms, which provide more accurate indications of the charging state of power supplies and/or power flow through the subsystems 150.

In this example, the controller 110 communicates with and/or controls at least a first subsystem of the plurality of subsystems, and/or the like. In this example, the first subsystem may be the non-hertzian power management subsystem 182, and/or the like.

The controller 1000 may receive a non-hertzian current or amperage from the non-hertzian power management subsystem 182. At 1002, the controller 110 displays, such as via a user interface of the platform 300, the received non-hertzian amperage.

Additionally and/or alternatively, the controller 110 may receive amp-hours indicating a non-hertzian current flow rate, from the non-hertzian power management subsystem 182. At 1004, the controller 110 displays, such as via a user interface of the platform 300, the received non-hertzian current flow rate. At 1006, the controller 110 may determine the non-hertzian flow rate is greater than or equal to a threshold limit. Based on that determination, the controller 110 may deactivate power flow within the energy environment by sending a control signal to the non-hertzian power management subsystem 182 and/or to one or more relays coupled to one or more subsystems 150. At 1008, the controller 110 may continue to track and display visualizations of the data received from the non-hertzian power management subsystem 182.

Figure 12A:
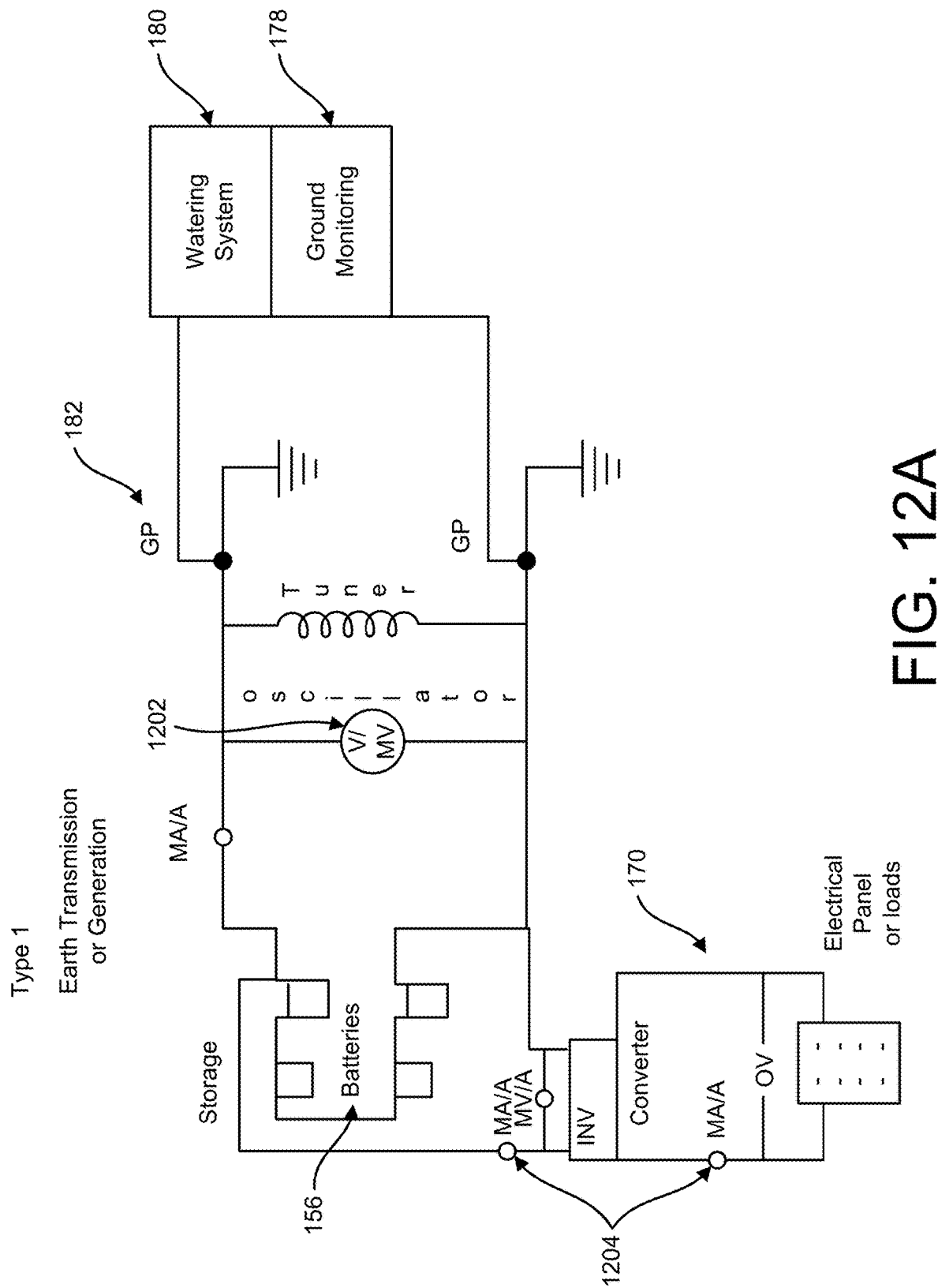
FIGS. 12A-12C schematically depict example non-hertzian waveform generator outputs, in accordance with some example implementations.
Figure 12B:
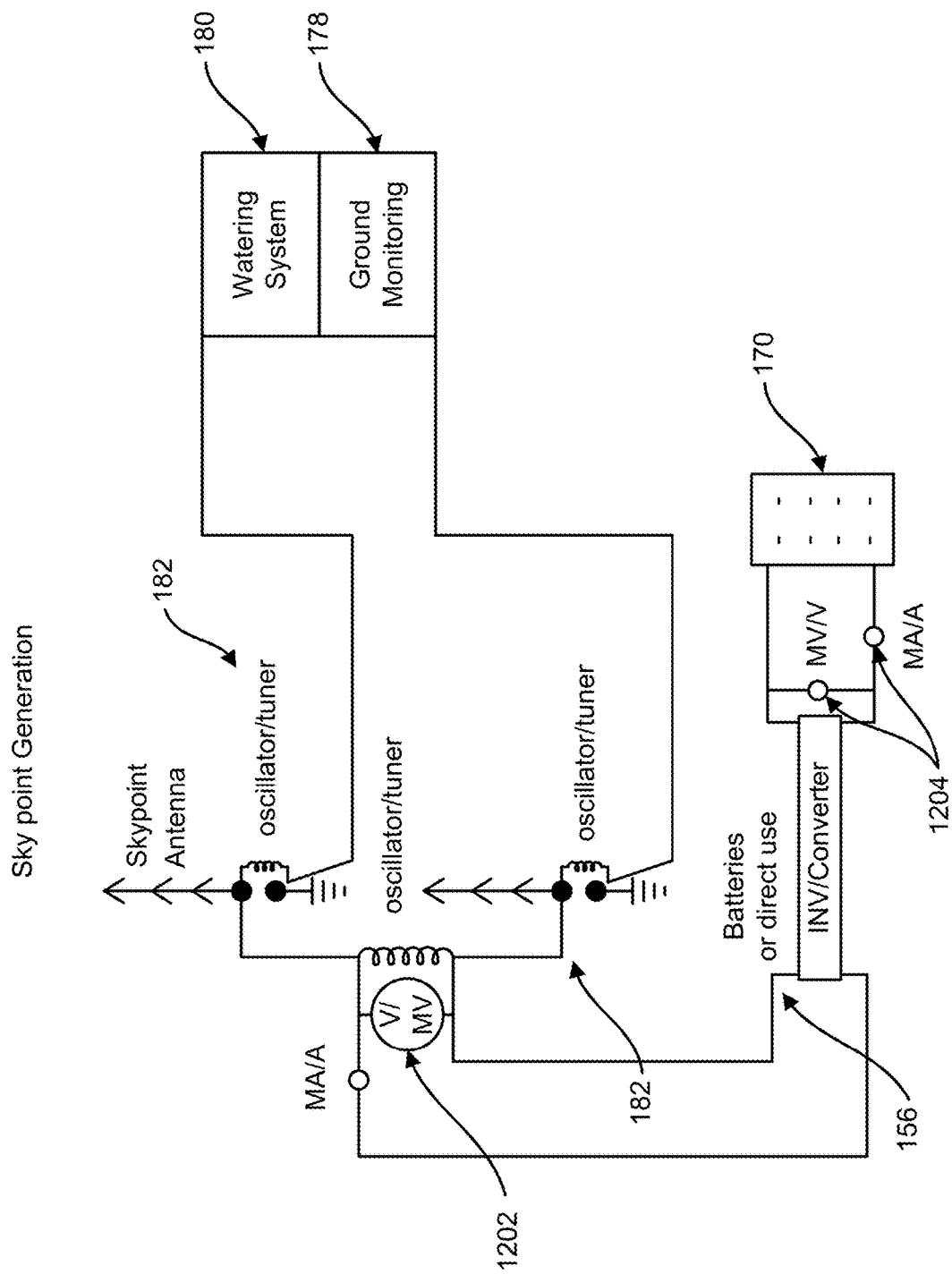
Figure 12C:
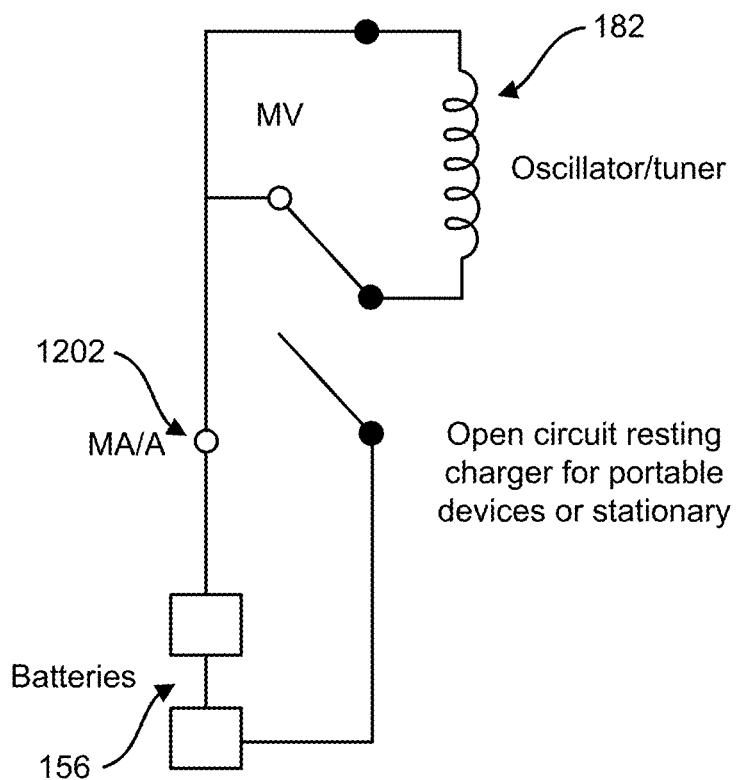

In some implementations, the controller 110 may measure one or more non-hertzian (N-H) waveforms generated by, for example, a N-H waveform generator of the non-hertzian power management subsystem 182. FIGS. 12A-12C schematically depict example non-hertzian waveform generator outputs, consistent with implementations of the current subject matter. These outputs may be monitored and/or controlled by the platform 300 and/or the controller 110.

The platform 300 may monitor and/or control the generation of N-H waveforms, such as via communication with one or more subsystems 150, such as the non-hertzian power management subsystem 182, the irrigation subsystem 180, the ground rod resistance monitoring subsystem 178, the battery management subsystem 156, and/or the solar management subsystem 170, among others. For example, the irrigation subsystem 180 and the ground rod resistance monitoring subsystem 170 may be coupled to at least two ground rods (see FIGS. 12A and 12B) to ensure the ground rod resistance does not exceed a threshold (see the workflow 500 of FIG. 5).

As an example, the non-hertzian power management subsystem 182 may generate N-H waveforms (e.g., from the ground between at least two ground rods) to charge one or more batteries (e.g., power supplies) of the battery management subsystem 156. Referring to FIG. 12A, which shows an example circuit diagram, the non-hertzian power management subsystem 182 may include a tuner and an oscillator for generating the N-H waveforms. A sensor 1202 of the non-hertzian power management subsystem 182 may measure the amperage (mA, A, etc.) of the generated current and/or a voltage across the non-hertzian power management subsystem 182. The platform 300, such as via the controller 110 may monitor and/or receive the measured amperage and/or voltage from the sensor 1202. The current from the generated N-H waveforms may be supplied to the batteries of the battery management subsystem 156 to charge the batteries. The controller 110 may monitor the charging state of the batteries. Thus, the controller 110 may determine whether the batteries are actually being charged. The controller 110 may also cause the generated energy from one or more photovoltaic panels of the solar management subsystem 170 to further charge the batteries. In doing so, the controller 110 may control a converter and/or an inverter coupled to the panels. The controller 110 may monitor the energy flow through the system, such as via sensors 1204.

As another example, the non-hertzian power management subsystem 182 may generate N-H waveforms (e.g., from one or more electrical systems in the environment 350) to charge one or more batteries (e.g., power supplies) of the battery management subsystem 156. Referring to FIG. 12B, which shows an example circuit diagram, the non-hertzian power management subsystem 182 may include a tuner and an oscillator for generating the N-H waveforms. A sensor 1202 of the non-hertzian power management subsystem 182 may measure the amperage (mA, A, etc.) of the generated current and/or a voltage across the non-hertzian power management subsystem 182. The platform 300, such as via the controller 110 may monitor and/or receive the measured amperage and/or voltage from the sensor 1202. The current from the generated N-H waveforms may be supplied to the batteries of the battery management subsystem 156 to charge the batteries. The controller 110 may monitor the charging state of the batteries. Thus, the controller 110 may determine whether the batteries are actually being charged. The controller 110 may also cause the generated energy from one or more photovoltaic panels of the solar management subsystem 170 to further charge the batteries. In doing so, the controller 110 may control a converter and/or an inverter coupled to the panels. The controller 110 may monitor the energy flow through the system, such as via sensors 1204.

As a further example, the non-hertzian power management subsystem 182 may generate N-H waveforms (e.g., from one or more electrical systems in the environment 350) to charge one or more batteries (e.g., power supplies) of the battery management subsystem 156. The subsystem 182 shown in FIG. 12C may be used with portable and/or stationary devices to charge the batteries of those devices. Referring to FIG. 12C, which shows an example circuit diagram, the non-hertzian power management subsystem 182 may include a tuner and an oscillator for generating the N-H waveforms. A sensor 1202 of the non-hertzian power management subsystem 182 may measure the amperage (mA, A, etc.) of the generated current and/or a voltage across the non-hertzian power management subsystem 182. The platform 300, such as via the controller 110 may monitor and/or receive the measured amperage and/or voltage from the sensor 1202. The current from the generated N-H waveforms may be supplied to the batteries of the battery management subsystem 156 to charge the batteries. The controller 110 may monitor the charging state of the batteries. Thus, the controller 110 may determine whether the batteries are actually being charged.

Figure 11:
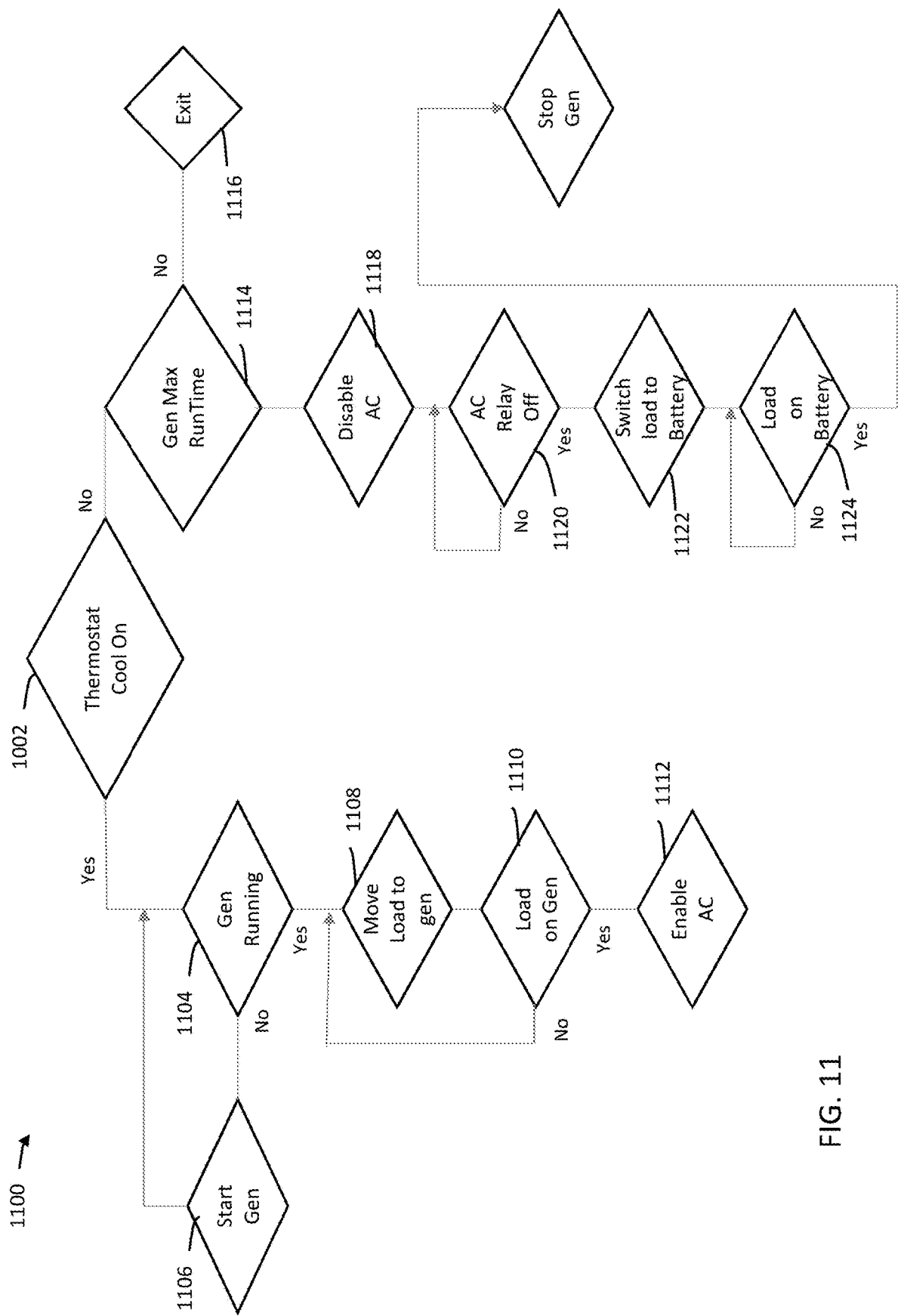
FIG. 11 depicts an example workflow for HVAC/R system monitoring, in accordance with some example implementations.

FIG. 11 depicts an example workflow 1100 for HVAC/R system monitoring, consistent with implementations of the current subject matter. When a building is off-grid, such that the building runs its electrical needs using batteries, such as batteries of the battery management subsystem 156, inverters coupled to the batteries convert stored energy to alternating current to run all normal electrical appliances. Air conditioners take an enormous amount of power when they start. Often, inverters, such as battery or solar inverters cannot handle the heavy startup loads, such as loads from air conditioning compressors. To ensure the inverters are protected, the controller 110 of the platform 300 may receive an input from a thermostat, test the voltage output of the generator, start the generator, test the voltage output of the generator, switch the load from an inverter (e.g., battery) to generator, and test that load moved to generator before enabling the compressors to run. When the air conditioning compressors are no longer needed, the controller 110 may deactivate the air conditioning compressors and shift the load back to the batteries (e.g., inverters coupled to the batteries). Thus, consistent with implementations of the current subject matter, the platform 300 may monitor and/or control multiple subsystems to prevent or limit damage caused to the batteries and/or solar systems, and/or to ensure the HVAC/R systems do not fail.

In this example, the controller 110 communicates with and/or controls at least a first subsystem of the plurality of subsystems, a second subsystem of the plurality of subsystems, a third subsystem of the plurality of subsystems, and/or the like. In this example, the first subsystem may be the HVAC/R subsystem 184, the second subsystem may be the power generator 174, and the third subsystem may be the battery management subsystem 156 and/or the solar management subsystem 170. Thus, the controller 110 may communicate with each of the HVAC/R subsystem 184, the power generator 174, the battery management subsystem 156, and/or another subsystem to control operation of the HVAC/R subsystem 184, the power generator 174, the battery management subsystem 156, based at least on a state of and/or measurements received from the HVAC/R subsystem 184, the power generator 174, the battery management subsystem 156.

At 1002, the controller 110 may receive a request from a thermostat of the HVAC/R subsystem 184 to activate the air conditioning compressor of the HVAC/R subsystem 184, to cool the air within the environment 350, such as in the building 310. For example, the thermostat may transmit the request to the controller 110. In response, at 1104, the controller 110 may retrieve generator data from the generator 174 to determine whether the generator 174 is running. If the controller 110 determines the power generator 174 has not been activated, the controller 110, at 1106, causes activation of the generator 174. For example, the controller may send a control signal to the generator and/or cause a relay coupled to the generator 174 to switch the generator 174 on. The power generator 174 may receive the control signal (e.g., directly from the controller 110 or via the relay) that causes the power generator 174 to be activated. Once the generator has been activated, the controller 110 continues to step 1108.

Alternatively, the controller 110 may determine the power generator 174 has been activated. At 1108, in response to determining the power generator 174 has been activated, the controller 1108 may move a load, such as the startup load for starting the air conditioning compressor, to the generator 174 from a power supply of the battery management system 156. The generator 174 may, as a result, provide power to supply the startup load for starting the air conditioning compressor.

At 1110, the controller 110 may confirm that the load has shifted from the power supply to the generator 174. For example, the controller 110 may perform one or more tests, such as voltage tests, to determine whether the load has shifted from the power supply to the generator 174. If the controller 110 determines the load has not shifted, the controller 110 returns to step 1108. Upon determination that the load has shifted to the generator 174, the controller 110 may activate the air conditioning compressor of the HVAC/R subsystem 184, at 1112. The air conditioning compressor may receive the control signal (e.g., directly from the controller 110 or via the relay) that causes the air conditioning compressor to be activated.

In some implementations, when the air conditioning compressors are no longer being requested, the controller 1110 may communicate with the subsystems 150 to turn off the generator 174 and switch the load back to the power supply. For example, at 1114, the controller 110 determines the generator and/or air conditioning compressor has run to its maximum predetermined time period. If not, then at 1116, the controller 110 continues to monitor the HVAC/R subsystem 184 at 1002. When the controller 110 determines the maximum time period has been completed and/or receives a request to disable the air conditioning compressor, such as from the thermostat, the controller 110 disables the air conditioning compressor at 1118. For example, the controller 110 may cause, at 1120, a relay coupled to the air conditioning compressor to deactivate the air conditioning compressor. The air conditioning compressor may receive the control signal (e.g., directly from the controller 110 or via the relay) that causes the air conditioning compressor to be deactivated. The controller 110 may confirm that the air conditioning compressor has been disabled before shifting the load back to the power supply.

At 1122, the controller 110 may, upon disabling the air conditioning compressor, shift the load back to the power supply of the battery management subsystem 156. At 1124, the controller 110 may test the power supply to determine whether the load has been shifted back to the power supply. Upon confirming that the load has been shifted to the power supply, the controller 110 causes the power generator to deactivate or otherwise be disabled. For example, the controller 110 may send a control signal to the generator 174 to deactivate the generator 174. The generator 174 may receive the control signal (e.g., directly from the controller 110 or via the relay) that causes the generator 174 to be deactivated. Additionally and/or alternatively, the controller 110 may cause a relay coupled to the generator 174 to deactivate the generator 174. Accordingly, the platform 300, including the controller 110 consistent with implementations of the current subject matter, may prevent or limit damage caused to the inverter coupled to the power supply, to the power supply, and/or the like, by the startup load of activating the air conditioning compressors. As a result, the platform 300 controls and communicates with the plurality of separate subsystems to improve the efficiency and longevity of the energy management system 100. While the air conditioning compressors are described with respect to the workflow 1100, the workflow 1100 may be used to control (in addition and/or alternatively to the air conditioning compressors) a supply and/or return fan speed of the HVAC/R subsystem 184.

FIG. 13 depicts a flowchart illustrating a process 1300 for monitoring (e.g., simultaneously) and controlling (e.g., simultaneously) a plurality of subsystems of an energy environment using the energy management system consistent with implementations of the current subject matter. As described herein, the energy environment may include, among other components, a photovoltaic panel and a power supply configured to store energy generated by the photovoltaic panel.

At 1302, a controller (e.g., the controller 110 of the energy management platform may receive data from a first subsystem of the plurality of subsystems. The first subsystem may include one or more of the voltage sensor 152, the current sensor 154, the battery management subsystem 156, the temperature sensor 158, the frequency sensor 160, the flow sensor 162, the sunlight radiation monitoring system 164, the humidity sensor 166, the ground fault sensor 168, the solar management subsystem 170, the wind production system 172, the power generator 174, the building load management subsystem 176, the ground resistance monitoring subsystem 178, the irrigation subsystem 180, the non-hertzian the power management subsystem 182, the HVAC/R subsystem 184, and/or the like.

At 1304, the controller may adjust, based on the received data, operation of a second subsystem of the plurality of subsystems. The second subsystem may include one or more of the voltage sensor 152, the current sensor 154, the battery management subsystem 156, the temperature sensor 158, the frequency sensor 160, the flow sensor 162, the sunlight radiation monitoring system 164, the humidity sensor 166, the ground fault sensor 168, the solar management subsystem 170, the wind production system 172, the power generator 174, the building load management subsystem 176, the ground resistance monitoring subsystem 178, the irrigation subsystem 180, the non-hertzian the power management subsystem 182, the HVAC/R subsystem 184, and/or the like.

As an example consistent with implementations of the current subject matter, the first subsystem may be a battery management system including the power supply and a voltage monitor coupled to the power supply. The voltage monitor may determine a voltage provided by the power supply. The data received from the first subsystem in this example may be the voltage. In this example, the second subsystem may be a power generator. The controller may also receive data from and/or control a third subsystem (e.g., a solar management subsystem including the photovoltaic panel and a solar production monitor configured to determine a solar load generated by the photovoltaic panel) and a fourth subsystem (e.g., a building load management subsystem including a building load monitor configured to determine a building load consumed by one or more building systems of the building load management subsystem). In this example, at 1304, the controller may determine the voltage from the battery management subsystem meets a threshold voltage, retrieve, in response to the determination that the voltage is less than the threshold voltage, the solar load from the solar management subsystem and the building load from the building load management subsystem, and compare the solar load to the building load. The controller may also determine the solar load is less than the building load. Based on the determining the solar load is less than the building load, the controller may activate the power generator. After causing activation of the power generator, the controller may retrieve an updated voltage from the battery management subsystem, determine the updated voltage meets an updated threshold voltage, and cause deactivation of the power generator based on the determination the updated voltage meets the updated threshold voltage.

In another example consistent with implementations of the current subject matter, the first subsystem may be a ground resistance monitoring subsystem configured to measure a ground rod resistance of a ground rod positioned within an area of a ground and the second subsystem may be an irrigation subsystem. The data received by the controller, at 1302, includes the ground rod resistance. At 1304, the controller may determine the ground rod resistance meets (e.g., is greater than or equal to) a threshold ground rod resistance, and in response, activate the irrigation subsystem to wet the area of the ground in which the ground rod is positioned. After activating the irrigation subsystem, the controller may retrieve an updated ground rod resistance from the ground resistance subsystem, determine the updated ground rod resistance is below an updated threshold ground rod resistance, and deactivate the irrigation subsystem.

In another example consistent with implementations of the current subject matter, the first subsystem may be a solar management subsystem that includes the photovoltaic panel, and a current monitor configured to monitor an amperage generated by the photovoltaic panel. At 1302, the controller receives the amperage from the solar management subsystem. At 1304, the controller may determine the amperage received from the solar management subsystem is less than a threshold amperage and thus detect the photovoltaic panel is missing and/or defective. The controller may then deactivate the solar management subsystem and/or transmit an alert.

In another example consistent with implementations of the current subject matter, the first subsystem may be a non-hertzian power management subsystem configured to monitor a non-hertzian amperage within the energy environment. At 1302, the controller may receive the non-hertzian amperage from the non-hertzian power management subsystem. At 1304, the controller may determine the non-hertzian amperage meets a threshold non-hertzian amperage. Based on that determination, the controller may deactivate power flow within the energy environment.

In another example consistent with implementations of the current subject matter, the first subsystem may be an HVAC/R subsystem that includes an air conditioning compressor, and a thermostat configured to activate the air conditioning compressor. The second subsystem may include a power generator. At 1302, the controller may receive a request from the thermostat to activate the air conditioning compressor. At 1304, based on generator data received from the power generator, the controller may determine the power generator has been activated. As a result, the controller may cause a load for activating the air conditioning compressor to be moved from the power supply to the power generator. After causing the load to move to the power generator, the controller may cause the air conditioning compressor to be activated. In some implementations, the controller receives updated data from the HVAC/R subsystem that indicates the air conditioning compressor is no longer being requested to be activated. In response, the controller may disable the air conditioning compressor. The controller may then move the load from the power generator to a third subsystem, which in this case may be a battery management subsystem including a power supply. Thus, the controller may cause the load to be moved from the power generator to the power supply after disabling the air conditioning compressor.

The subsystems described herein may be interchanged and/or each controlled and/or monitored by the energy management platform consistent with implementations of the current subject matter, to provide a central monitoring station that improves the efficiency of the subsystems and reduces the degradation of the subsystems.

Figure 14:
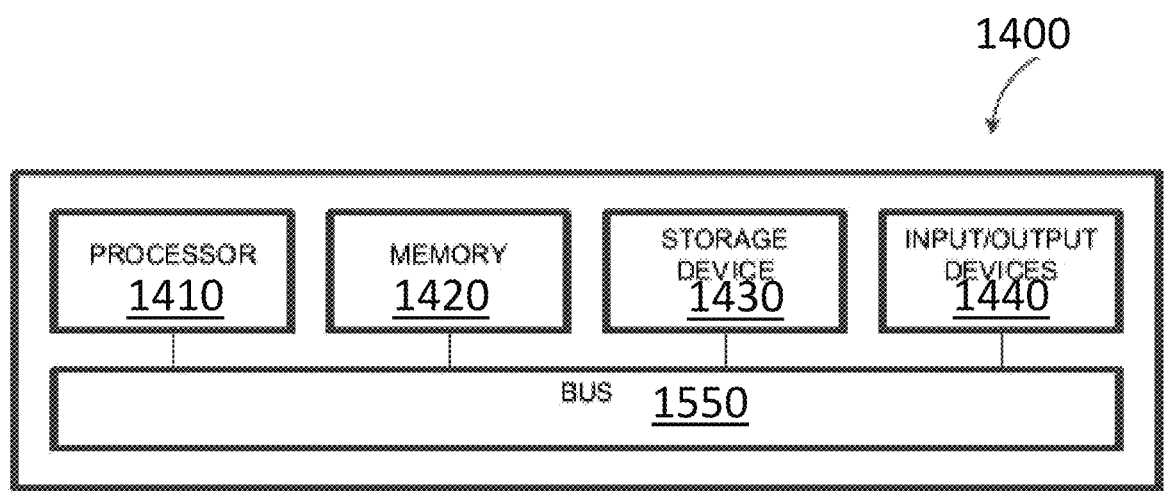
FIG. 14 depicts a block diagram illustrating a computing system, in accordance with some example implementations.

FIG. 14 depicts a block diagram illustrating a computing system 1400 consistent with implementations of the current subject matter. Referring to FIGS. 1 and 14, the computing system 1400 can be used to implement the energy management system 100, and/or any components therein.

As shown in FIG. 14, the computing system 1400 can include a processor 1410, a memory 1420, a storage device 1430, and indication/output devices 1440. The processor 1410, the memory 1420, the storage device 1430, and the indication/output devices 1440 can be interconnected via a system bus 1550. The processor 1410 is capable of processing instructions for execution within the computing system 1400. Such executed instructions can implement one or more components of, for example, the energy management system 100 at the database 140. In some example embodiments, the processor 1410 can be a single-threaded processor. Alternately, the processor 1410 can be a multi-threaded processor. The processor 1410 is capable of processing instructions stored in the memory 1420 and/or on the storage device 1430 to display graphical information for a user interface provided via the indication/output device 1440.

The memory 1420 is a computer readable medium such as volatile or non-volatile that stores information within the computing system 1400. The memory 1420 can store data structures representing configuration object databases, for example. The storage device 1430 is capable of providing persistent storage for the computing system 1400. The storage device 1430 can be a floppy disk device, a hard disk device, an optical disk device, a tape device, a solid state device, and/or other suitable persistent storage means. The indication/output device 1440 provides indication/output operations for the computing system 1400. In some example embodiments, the indication/output device 1440 includes a keyboard and/or pointing device. In various implementations, the indication/output device 1440 includes a display unit for displaying graphical user interfaces.

According to some example embodiments, the indication/output device 1340 can provide indication/output operations for a network device. For example, the indication/output device 1340 can include Ethernet ports or other networking ports to communicate with one or more wired and/or wireless networks (e.g., a local area network (LAN), a wide area network (WAN), the Internet).

In some example embodiments, the computing system 1300 can be used to execute various interactive computer software applications that can be used for organization, analysis and/or storage of data in various formats. Alternatively, the computing system 1300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the indication/output device 1340. The user interface can be generated and presented to a user by the computing system 1300 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An energy management system for an energy environment comprising a photovoltaic panel; and a power supply configured to store energy generated by the photovoltaic panel, the energy management system comprising:
    a plurality of subsystems comprising:
        a first subsystem; and
        a second subsystem; and
    an energy management platform for monitoring and controlling each of the plurality of subsystems, the energy management platform comprising: a user interface; and a controller communicatively coupled to each of the plurality of subsystems, the controller configured to:
        receive data from the first subsystem;
        adjust, based on the received data, operation of the second subsystem; and
        display, based on the data and via the user interface, an indication comprising one or more of a status alert, a report, and a recommendation.

2. The system of claim 1, wherein the first subsystem and the second subsystem are each configured to communicate with the energy management platform; and wherein the first subsystem is configured to not communicate directly with the second subsystem.

3. The system of claim 1, wherein the controller is configured to monitor the first subsystem; and simultaneously monitor the second subsystem.

4. The system of claim 1, wherein the platform comprises one or more protocols that enable communication with each of the plurality of subsystems.

5. The system of claim 1, wherein the user interface is configured to display the data received from each of the first subsystem and the second subsystem.

6. The system of claim 1, wherein the first subsystem is associated with a first vendor; and wherein the second subsystem is associated with a second vendor.

7. The system of claim 1, wherein the adjusting comprises disabling the second subsystem.

8. The system of claim 1, wherein the data is indicative of at least one of environmental conditions, loads, temperatures, solar isolation, or wind information.

9. The system of claim 1, wherein the adjusted operation of the second subsystem is based on data stored or received by the controller and generated or tracked by at least one of the plurality of subsystems.

10. The system of claim 1, wherein operation of the second subsystem is adjusted based on a prediction generated by the controller based on the data.

11. An energy management system for an energy environment comprising a photovoltaic panel; and a power supply configured to store energy generated by the photovoltaic panel, the energy management system comprising:
    a plurality of subsystems comprising:
        a first subsystem, wherein the first subsystem is a battery management subsystem comprising a power supply and a voltage monitor coupled to the power supply, the voltage monitor configured to determine a voltage provided by the power supply;
        a second subsystem, wherein the second subsystem is a power generator;
        a third subsystem, wherein the third subsystem is a solar management subsystem comprising the photovoltaic panel; and a solar production monitor configured to determine a solar load generated by the photovoltaic panel;
        a fourth subsystem, wherein the fourth subsystem is a building load management subsystem comprising a building load monitor configured to determine a building load consumed by one or more building systems of the building load management subsystem; and
    an energy management platform for monitoring and controlling each of the plurality of subsystems, the energy management platform comprising: a user interface; and a controller communicatively coupled to each the plurality of subsystems, the controller configured to:
        receive data from the first subsystem, wherein the data comprises the voltage; and
        adjust, based on the received data, operation of the second subsystem.

12. The system of claim 11, wherein the adjusting comprises:
    determining the voltage from the battery management subsystem meets a threshold voltage;
    retrieving, in response to the determination that the voltage is less than the threshold voltage, the solar load from the solar management subsystem and the building load from the building load management subsystem; and
    comparing the solar load to the building load.

13. The system of claim 12, wherein the adjusting further comprises:
    determining the solar load is less than the building load; and
    causing, based on the determining the solar load is less than the building load, activation of the power generator.

14. The system of claim 13, wherein the adjusting further comprises:
    retrieving, after causing activation of the power generator, an updated voltage from the battery management subsystem;
    determining the updated voltage meets an updated threshold voltage; and
    causing, based on the determination the updated voltage meets the updated threshold voltage, deactivation of the power generator.

15. The system of claim 11, wherein the first subsystem and the second subsystem are each configured to communicate with the energy management platform; and wherein the first subsystem is configured to not communicate directly with the second subsystem.

16. The system of claim 11, wherein the controller is configured to monitor the first subsystem; and simultaneously monitor the second subsystem.

17. The system of claim 11, wherein the platform comprises one or more protocols that enable communication with each of the plurality of subsystems.

18. The system of claim 11, wherein the user interface is configured to display the data received from each of the first subsystem and the second subsystem.

19. The system of claim 11, wherein the first subsystem is associated with a first vendor; and wherein the second subsystem is associated with a second vendor.

20. The system of claim 11, wherein the adjusting comprises disabling the second subsystem.

21. The system of claim 11, wherein the controller is further configured to: display, based on the data and via the user interface, an indication comprising one or more of a status alert, a report, and a recommendation.

22. The system of claim 11, wherein the data further comprises at least one of environmental conditions, loads, temperatures, solar isolation, or wind information.

23. The system of claim 11, wherein the adjusted operation of the second subsystem is further based on data stored by the controller and generated or tracked by at least one of the plurality of subsystems.

24. The system of claim 11, wherein operation of the second subsystem is adjusted based on a prediction generated by the controller based on the data.

25. An energy management system for an energy environment comprising a photovoltaic panel; and a power supply configured to store energy generated by the photovoltaic panel, the energy management system comprising:
a plurality of subsystems comprising:
a first subsystem, wherein the first subsystem is a ground resistance monitoring subsystem configured to measure a ground rod resistance of a ground rod positioned within an area of a ground; and
a second subsystem wherein the second subsystem is an irrigation subsystem; and
an energy management platform for monitoring and controlling each of the plurality of subsystems, the energy management platform comprising: a user interface; and
a controller communicatively coupled to each the plurality of subsystems, the controller configured to:
receive data from the first subsystem wherein the data comprises the ground rod resistance, and
adjust, based on the received data, operation of the second subsystem.

26. The system of claim 25, wherein the adjusting comprises:
determining the ground rod resistance retrieved from the ground resistance monitoring subsystem meets a threshold ground rod resistance; and
causing, based on the determination the ground rod resistance meets the threshold ground rod resistance, activation of the irrigation subsystem to wet the area of the ground in which the ground rod is positioned.

27. The system of claim 26, wherein the adjusting further comprises:
retrieving, after causing activation of the irrigation subsystem, an updated ground rod resistance from the ground resistance subsystem;
determining the updated ground rod resistance is below an updated threshold ground rod resistance; and
causing, based on the determination the updated ground rod resistance is below the updated threshold ground rod resistance, deactivation of the irrigation subsystem.

28. The system of claim 25, wherein the first subsystem and the second subsystem are each configured to communicate with the energy management platform; and wherein the first subsystem is configured to not communicate directly with the second subsystem.

29. The system of claim 25, wherein the controller is configured to monitor the first subsystem; and simultaneously monitor the second subsystem.

30. The system of claim 25, wherein the platform comprises one or more protocols that enable communication with each of the plurality of subsystems.

31. The system of claim 25, wherein the user interface is configured to display the data received from each of the first subsystem and the second subsystem.

32. The system of claim 25, wherein the first subsystem is associated with a first vendor; and wherein the second subsystem is associated with a second vendor.

33. The system of claim 25, wherein the adjusting comprises disabling the second subsystem.

34. The system of claim 25, wherein the controller is further configured to: display, based on the data and via the user interface, an indication comprising one or more of a status alert, a report, and a recommendation.

35. The system of claim 25, wherein the data further comprises at least one of environmental conditions, loads, temperatures, solar isolation, or wind information.

36. The system of claim 25, wherein the adjusted operation of the second subsystem is further based on data stored by the controller and generated or tracked by at least one of the plurality of subsystems.

37. The system of claim 25, wherein operation of the second subsystem is adjusted based on a prediction generated by the controller based on the data.

38. An energy management system for an energy environment comprising a photovoltaic panel; and a power supply configured to store energy generated by the photovoltaic panel, the energy management system comprising:
a plurality of subsystems comprising:
a first subsystem, wherein the first subsystem is a solar management subsystem comprising the photovoltaic panel; and
a second subsystem;
a current monitor configured to monitor an amperage generated by the photovoltaic panel; and
an energy management platform for monitoring and controlling each of the plurality of subsystems, the energy management platform comprising: a user interface, and
a controller communicatively coupled to each of the plurality of subsystems, the controller configured to:
receive data from the subsystem, wherein the data comprises the amperage, and
adjust, based on the received data, operation of the second subsystem.

39. The system of claim 38, wherein the adjusting further comprises:
determining the amperage received from the solar management subsystem is less than a threshold amperage;
detecting, based on the determination the amperage is less than a threshold amperage, the photovoltaic panel is missing and/or defective; and
transmitting, based on the detection, an alert.

40. The system of claim 38, wherein the first subsystem and the second subsystem are each configured to communicate with the energy management platform; and wherein the first subsystem is configured to not communicate directly with the second subsystem.

41. The system of claim 38, wherein the controller is configured to monitor the first subsystem; and simultaneously monitor the second subsystem.

42. The system of claim 38, wherein the platform comprises one or more protocols that enable communication with each of the plurality of subsystems.

43. The system of claim 38, wherein the user interface is configured to display the data received from each of the first subsystem and the second subsystem.

44. The system of claim 38, wherein the first subsystem is associated with a first vendor; and wherein the second subsystem is associated with a second vendor.

45. The system of claim 38, wherein the adjusting comprises disabling the second subsystem.

46. The system of claim 38, wherein the controller is further configured to: display, based on the data and via the user interface, an indication comprising one or more of a status alert, a report, and a recommendation.

47. The system of claim 38, wherein the data further comprises at least one of environmental conditions, loads, temperatures, solar isolation, or wind information.

48. The system of claim 38, wherein the adjusted operation of the second subsystem is further based on data stored by the controller and generated or tracked by at least one of the plurality of subsystems.

49. The system of claim 38, wherein operation of the second subsystem is adjusted based on a prediction generated by the controller based on the data.

50. The system of claim 49, wherein the data further comprises at least one of environmental conditions, loads, temperatures, solar isolation, or wind information.

51. An energy management system for an energy environment comprising a photovoltaic panel; and a power supply configured to store energy generated by the photovoltaic panel, the energy management system comprising:
   a plurality of subsystem comprising:
      a first subsystem, wherein the first subsystem is a non-hertzian power management subsystem configured to monitor a non-hertzian amperage within the energy environment; and
      a second subsystem; and
   an energy management platform for monitoring and controlling each of the plurality of subsystems, the energy management platform comprising: a user interface; and a controller communicatively coupled to each of the plurality of subsystems, the controller configured to:
      receive data from the first subsystem, wherein the data is the non-hertzian amperage; and
      adjust, based on the received data, operation of the second subsystem.

52. The system of claim 51, wherein the adjusting further comprises:
   determining the non-hertzian amperage retrieved from the non-hertzian power management subsystem meets a threshold non-hertzian amperage; and
   causing, based on the determination, deactivation of power flow within the energy environment.

53. The system of claim 51, wherein the first subsystem and the second subsystem are each configured to communicate with the energy management platform; and wherein the first subsystem is configured to not communicate directly with the second subsystem.

54. The system of claim 51, wherein the controller is configured to monitor the first subsystem; and simultaneously monitor the second subsystem.

55. The system of claim 51, wherein the platform comprises one or more protocols that enable communication with each of the plurality of subsystems.

56. The system of claim 51, wherein the user interface is configured to display the data received from each of the first subsystem and the second subsystem.

57. The system of claim 51, wherein the first subsystem is associated with a first vendor; and wherein the second subsystem is associated with a second vendor.

58. The system of claim 51, wherein the adjusting comprises disabling the second subsystem.

59. The system of claim 51, wherein the controller is further configured to: display, based on the data and via the user interface, an indication comprising one or more of a status alert, a report, and a recommendation.

60. The system of claim 51, wherein the adjusted operation of the second subsystem is further based on data stored by the controller and generated or tracked by at least one of the plurality of subsystems.

61. The system of claim 51, wherein operation of the second subsystem is adjusted based on a prediction generated by the controller based on the data.

62. A method for monitoring and controlling a plurality of subsystems of an energy environment comprising a photovoltaic panel; and a power supply configured to store energy generated by the photovoltaic panel, the method comprising:
   receiving data from a first subsystem of the plurality of subsystems;
   adjusting, based on the received data, operation of a second subsystem of the plurality of subsystems; and
   displaying, based on the data and via a user interface, an indication comprising one or more of a status alert, a report, and a recommendation,
   wherein the first subsystem and the second subsystem separately communicate with an energy management platform.

63. The method of claim 62, wherein the data further comprises at least one of environmental conditions, loads, temperatures, solar isolation, or wind information.

64. The method of claim 62, wherein adjusting operation of the second subsystem further comprises analysis based on data stored by the controller and generated or tracked by at least one of the plurality of subsystems.

65. The method of claim 62, wherein adjusting operation of the second subsystem further comprises generating a prediction by the controller based on the data.

* * * * *